INVENTOR
HARRY D. WISE
BY Griffin and Stokes
ATTORNEYS

Dec. 28, 1965   H. D. WISE   3,226,694
INTERRUPT SYSTEM
Filed July 3, 1962   18 Sheets-Sheet 12

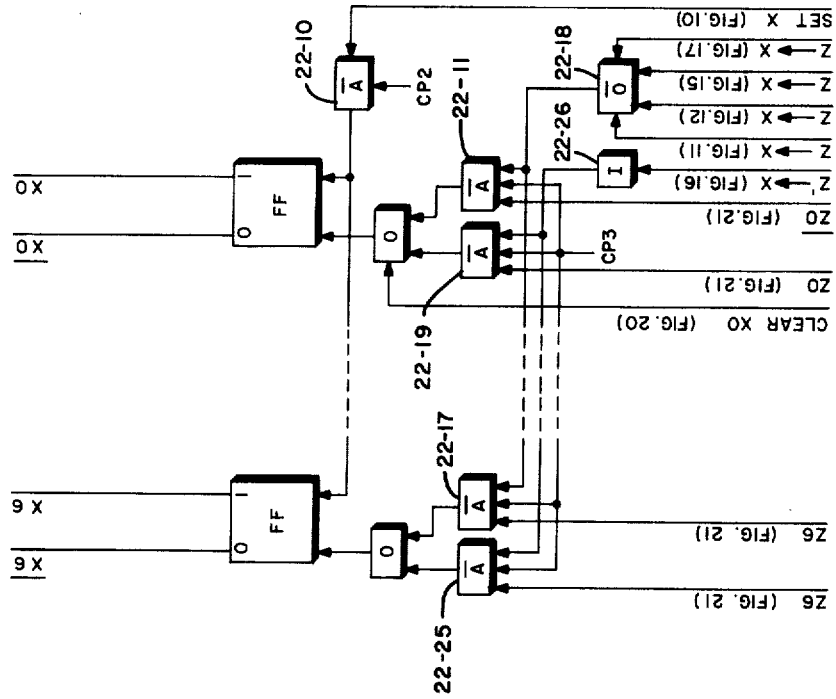
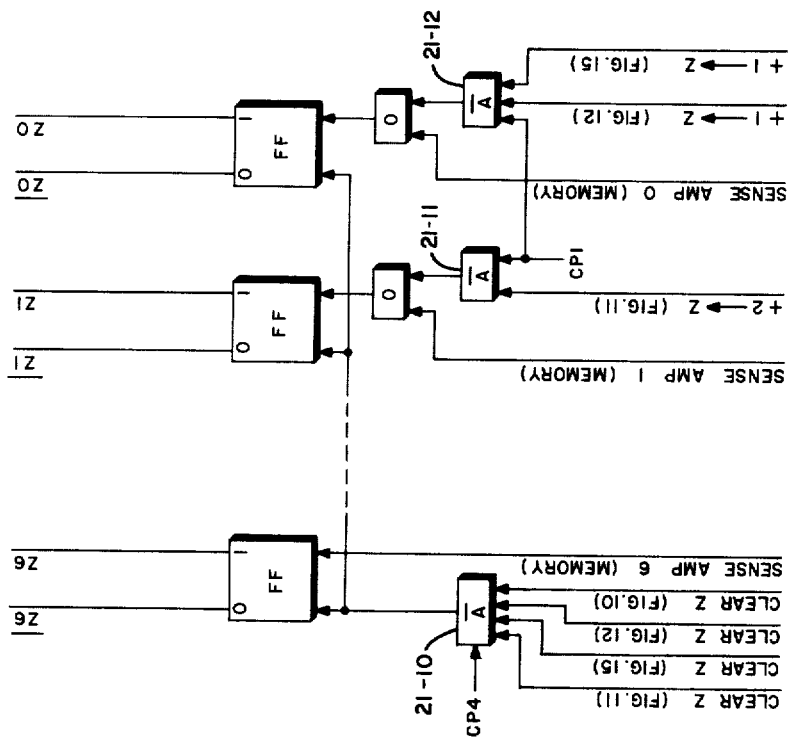
Fig. 22
Fig. 21

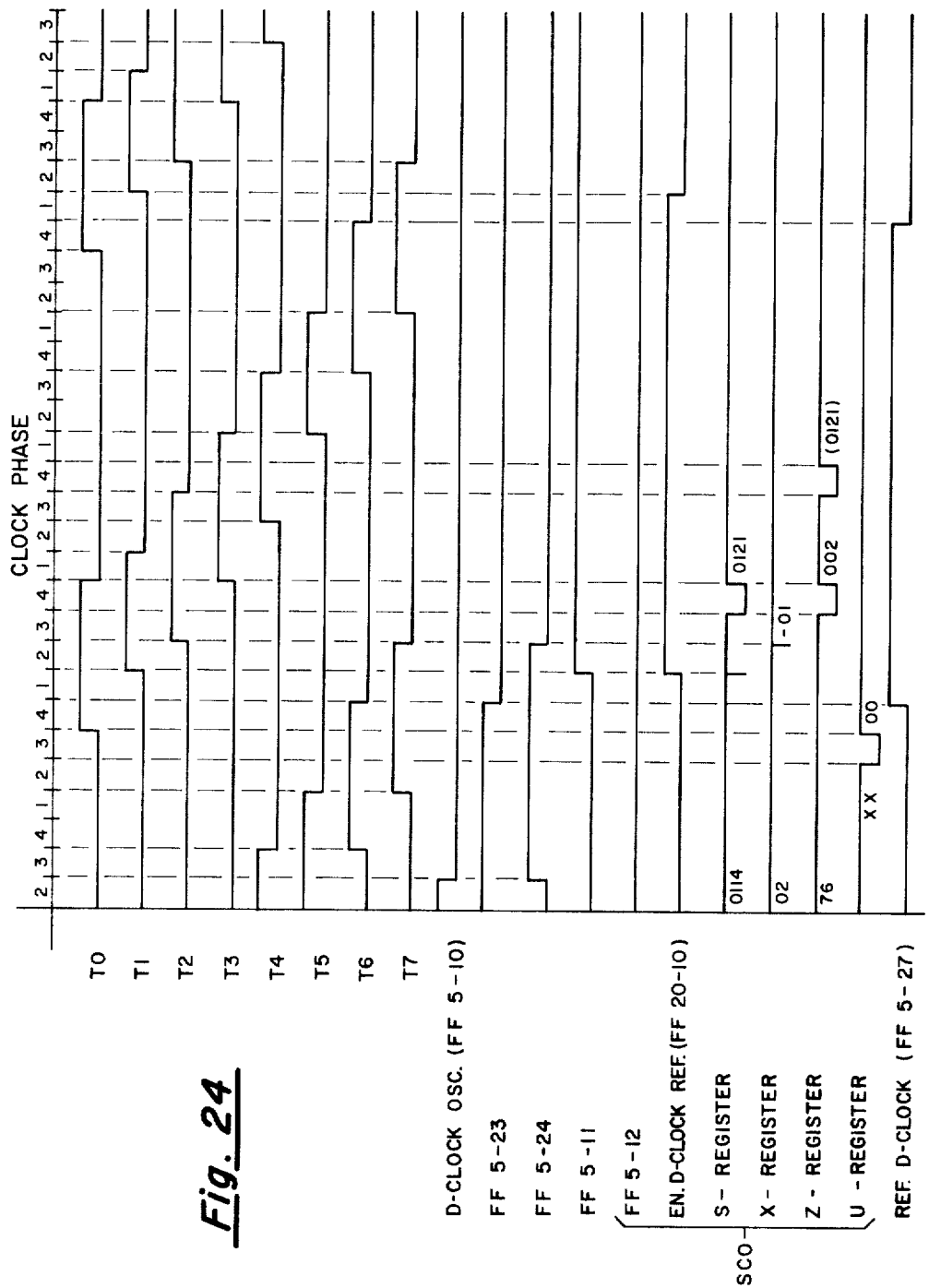

United States Patent Office 3,226,694
Patented Dec. 28, 1965

3,226,694
INTERRUPT SYSTEM
Harry D. Wise, Minneapolis, Minn., assignor to Sperry Rand Corporation, New York, N.Y., a corporation of Delaware
Filed July 3, 1962, Ser. No. 207,253
36 Claims. (Cl. 340—172.5)

This invention relates to selective control of a digital computer by one of several stored programs, and more particularly, to a system which provides operational registers individual to each of said stored programs.

Prior art stored program digital computers very often have some means of interrupting the running program upon demand of an external or internal signal. In most of these machines, the interrupt is performed by using the uniqueness of the interrupting channel to select the address of an instruction in a new program. However, before executing the new program, the contents of any indirectly addressable registers such as a program address counter, an accumulator register, or the like, must be preserved so that control may be returned to the interrupted program at some future date. For example, if the current running program has calculated an intermediate result which is placed into a single accumulator register, this intermediate result must be stored in some specific location so that it will not be lost since the accumulator register may be utilized in the execution of the interrupting program. As another example, if only a single program address counter is provided in the system, the address of the next instruction in the current interrupted program must be stored elsewhere so that the program address counter may be thereafter used to supply addresses of the interrupting program. In a multi-interrupt system, the time used to store and restore operational registers can become excessive.

The present invention obviates the above disadvantages of multi-interrupt operation by providing a separate set of operational registers for each one of the stored programs. Since each interrupt program is provided with its own complete set of operational registers, there is substantial reduction of the need for "housekeeping" instructions with every switch between stored programs.

Therefore, one object of this invention is to provide operational registers unique to each stored program so that a change in control between programs requires no special executive program.

A further object of the invention is to provide a number of program address means equal to the number of stored programs, where each program address means is adapted to sequentially supply the addresses of the instructions for a particular one of said programs.

Another object of the invention is to provide an accumulator register for each of the stored programs so that upon change of program control, there is no need to use time in order to store the content of an accumulator register into another location.

Yet another object of the present invention is to provide a separate index modifying register for each of the possible stored programs.

The data processing system in which the present invention finds particular, although not exclusive, use, is constructed so that the operational registers are actually addressable locations in the internal high speed memory. Consequently, the single memory address register is used for obtaining the contents of the program address counter, the accumulator register, and index modifying register, as well as being used for the normal functions of obtaining new instructions and their operands. In this system arrangement, the sequence for interrupting a running program is to first recognize the interrupting event to thereby select a new program address register from the internal memory by using the interrupting event to "bias" the program address register's address in internal memory. The interrupting event is also used to modify the memory address of the various indirectly addressable registers such as the accumulator and index modifying registers.

Therefore, another object of the present invention is to provide a memory address register whose content may be modified by the particular interrupting event so as to selectively select operational registers in internal memory for use with the interrupting program.

If one stored program is to be initiated during the execution of a current program due to the occurrence of an interrupting event, some means must be provided to remember the program interrupted. In the present system this function is implemented by providing an interrupt status register having stages each of which is set by a particular interrupting event which may be internal or external. The interrupting events have priority among themselves such that one interrupting event can interrupt any lower priority interrupt program. Even though two or more stages in the interrupt status register are in a set condition at the same time, only the highest priority stage is effective as regards the selection of the set of operational registers for the program having this priority.

Therefore, another object of this invention is to provide an interrupt system with priority between different stored programs, each program having its own set of operational registers so as to reduce "housekeeping" time.

Other objects and features of the present invention will become apparent during the course of the following description, which is to be read in conjunction with the drawings, in which:

FIGURES 2a–2g show the basic logical components used to implement the present invention;

FIGURE 21 show details of the Z register;

FIGURE 22 shows details of the X register;

FIGURE 24 is a timing diagram illustrating the operation of the D-clock control.

In the figures, each component is identified by a hyphenated number, with the digit(s) to the left of the hyphen specifying the number of the figure in which the component is found. Input signals to a figure are, for the most part, identified in abbreviated form followed by digit(s) specifying the figure in which it is generated.

In some cases, the unit of generation is given where no details of the unit are shown.

Figure 1:
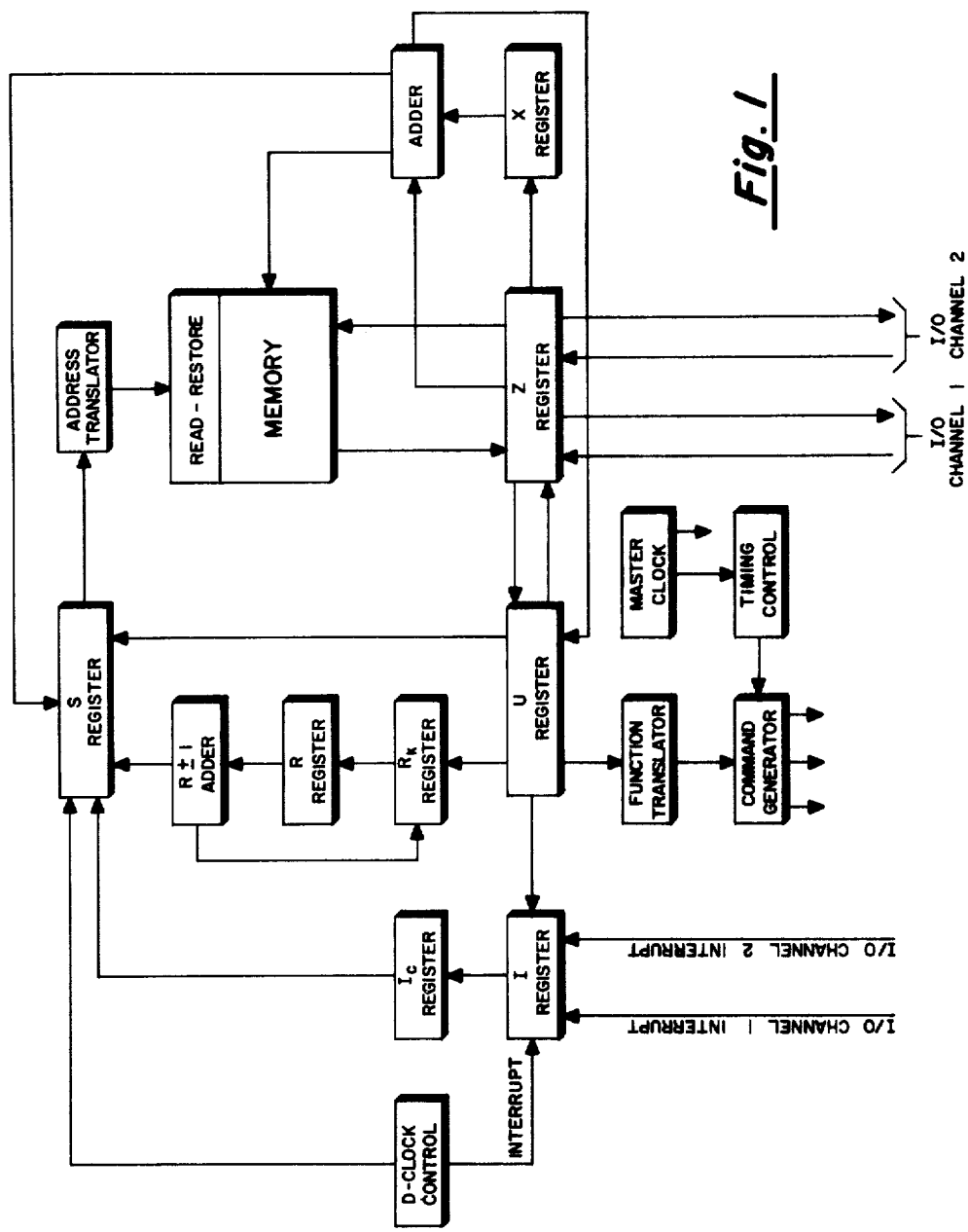
FIGURE 1 is an over-all block diagram of the data processing system in which the present invention finds particular use.

FIGURE 1 is an over-all block diagram of a data processing system in which the present invention finds particular, although not exclusive use. This system is a small, stored program digital computer some of whose applications in real time systems are as a communication switching center or as a process control data logger. The system has a random access, destructive read-out, core storage memory containing four thousand ninety six 7-bit word locations, each identified by a 12-binary bit (4 octal digits) address. Access to the memory for the purpose of either withdrawing or storing information is performed during a memory cycle which includes Read followed by Restore portions in the well known fashion. An instruction is defined by 14 binary bits which are assembled by acquiring two 7-bit words in consecutive memory cycles from adjacent memory locations. The least significant seven bits of the instruction are found in a word held by an even numbered memory address location, whereas the most significant seven bits of the instruction are held in the next higher odd numbered memory address location. As an example, an instruction might be comprised of a seven-bit word held in memory address 3126 (octal) and a seven-bit word in memory address 3127 (octal). The fourteen-bit instruction when assembled from memory contains a four-bit function code designator $f$, a two-bit accumulator register designator $a$, a two-bit extended address or index register designator $b$, and a six-bit operand designator $y$. These designators occupy the following bit positions of the instruction, with the bits in positions 0 through 6 being those found in the even numbered memory address location, and the bits in positions 7 through 13 being those found in the next higher odd numbered memory address location.

| 13 12 11 10 | 9 8 | 7 6 | 5 4 3 2 1 0 |
|---|---|---|---|
| $f$ | $a$ | $b$ | $y$ |

With the four-bit function designator $f$, the present system has a repertoire of sixteen basic functions. When extracting an operand from memory for use in executing an instruction, the lower order six bits of the operand address are provided by the $y$ designator portion of the instruction, whereas the higher order six bits of the operand address are supplied by the content of any one of four index registers specified in part by the two-bit $b$ designator of the instruction. These index registers are hereafter termed the B registers. The seven-bit operand from the memory location identified by this assembled twelve-bit address may be arithmetically combined with a seven-bit value contained in any one of four memory locations identified in part by the two-bit $a$ designator of the instruction. These registers identified by the $a$ designator are hereafter called the A registers or accumulated registers. In the present system, the A and B registers are particular locations in the core memory. For input and output instructions the $a$ designator is used to instead define certain input/output (I/O) operations such as the direction of information transferred between an external unit and memory. On the other hand, some non-I/O functions do not require the use of a value in the A register, in which case the $a$ designator can be used to further define the function and effectively extends the number of function bits $f$ to 6.

FIGURE 1 also shows the following registers which are comprised of flip-flop stages external to the core memory. The S register holds a 12-bit address for referencing memory. The Z register is a 7-bit memory portal through which all information acquired from memory passes before being distributed either to the external unit or to other flip-flop registers. The Z register also holds the A register operand. The X register holds the 7-bit operand acquired from the memory location whose address consists in part of the $y$ designator of the instruction. The adder is a logical matrix having inputs from both the Z and the X register and providing an output indicative of the sum of the two values held therein. Information may be written back into memory from either the Z register or from the output of the adder. The leftmost bit of the 7-bit operand is a sign bit which, if zero, designates a positive value. The arithmetic employed in the adder is 1's complement subtractive with end around borrow. The following gives examples of the 7-bit numbers employed in the system.

| Decimal | Octal | Binary |
|---|---|---|
| 0 | 000 | 0 000 000 |
| 1 | 001 | 0 000 001 |
| 28 | 034 | 0 011 100 |
| 63 | 077 | 0 111 111 |
| −63 | 100 | 1 000 000 |
| −28 | 143 | 1 100 011 |
| −1 | 176 | 1 111 110 |
| −0 | 177 | 1 111 111 |

Returning now to FIGURE 1, the U register is normally used to hold the 14-bit instruction currently being executed. It is also used as a transfer register during the acquisition of the address of the instruction. A function translator is provided which is responsive to the function designator $f$ and decodes same so that the proper commands can be generated for executing the function. These commands are generated primarily in a command generator portion of the system according to the decoded function as well as to timing control signals. This timing control in turn is synchronized with a master clock which generates four clock phases designated as CP1, CP2, CP3, and CP4. These clock phases are cyclically generated in succession without overlap, and are also applied to other circuits of the system in the manner subsequently to be described in connection with the remaining figures. The R register is comprised of twelve stages and is used for holding and modifying the operand address during a repeat sequence. It is also used for holding the next address when I/O buffer mode is active. Eight bits of this register are used for decrementing the repeat count during the repeats and buffers. The $R_K$ register is an 8-bit repeat count register whose content is decremented with each repeated instruction iterations or buffer character transfer, so as to indicate the number of iterations remaining to be performed or the number of characters that have to be transferred, respectively. The normal termination of a repeat or buffer function is determined by this register's content becoming equal to 0. If a repeat is terminated by the finding of a skip condition, the lower seven bits of this register are automatically stored in core memory address 0124 (octal). The R+1 adder performs the incrementing or decrementing of the $R_K$ register.

The system also includes two identical input-output channels 1 and 2. The two channels operate independently of each other; however, input and output on the same channel cannot be simultaneous. The input or output in either channel can either be buffered or programmed. Buffered I/O mode consists of transfer of several words of information to or from the computer memory, whereas programmed I/O mode consists of transfer of only one information word. A word may consist of up to seven binary bits. When buffered I/O is being performed, a program can be interrupted in the middle of an instruction to make the memory reference for the transfer of the character. The buffer mode is established by programming a repeat instruction followed by one of the I/O instructions. This results in the initiation of an I/O buffer operation of length specified by the repeat instruction. The first buffer storage address is normally specified by the I/O instruction; succeeding addresses are generated by +1, 0 or −1 modification of the first, as designated by the repeat instruction. After a buffer is initiated, the program continues.

A repeat instruction followed by a non-I/O instruction results in the next following instruction being repeated for up to 256 iterations as specified by a designator in the repeat instruction. The first operand address of the repeated instruction is as normally carried by that instruction; this is altered by adding +1, 0, or −1 for each succeeding iteration, as specified by a designator in the repeat instruction. Repeat sequences normally terminate by running their full course; however, if a skip condition is found during the repeat, then the content of the repeat count register (indicating the number of unperformed iterations) is stored in a particular memory location and the skip is executed.

As mentioned before, the four A registers and four B registers, any one of which may be designated by each instruction word, are found in the core memory at particular address locations. Also in core memory is the program address (P) register comprised of two adjacent memory locations which hold the address of the next instruction to be excuted. Further included in core memory is a group of four 7-bit incremental clock registers Delta 0, Delta 1, Delta 2, and Delta 5 which are used for timing the program sequences. Each of these Delta registers, whose content is in the range of 001 to 100 (expressed in octal), is decremented by 1 approximately once each millisecond as controlled by an oscillator contained in the D-clock control. This range of sixty-four steps gives the ability to time events of up to approximately 62.5 milliseconds.

The particular system of FIGURE 1 also features an interrupt control which permits the selective execution of one of eight different programs stored in memory. Priority of execution exists between programs. The present invention, as employed in this system environment, is concerned with providing an individual group of operational registers A and B, as well as a program address register P, for each one of these programs. This reduces the need for housekeeping instructions which otherwise would be required for every switch from one program to another. The interrupt status register, hereinafter referred to as the I register, is a 7-bit flip-flop register used for switching among the eight possible programs. The occurrence of any one of seven interrupt producing events (the lowest level priority does not produce an interrupt) sets a corresponding stage of the I register. At the start of an instruction cycle, the highest priority set stage of the I register causes a 3-bit $I_C$ register to be set to a value used to provide an address prefix for accessing a particular P register in memory. This P register contains the address of an instruction in the program having priority of execution in order that instructions belonging to that program may be acquired During the actual execution of an instruction, the content of $I_C$ is also used in conjunction with the $a$ and $b$ instruction designators to address the A and B registers reserved for this program. This feature enables the control to be switched randomly among eight major program routines without danger of a routine losing step, and further prevents the contents of the operational registers of one routine from being affected by another. Furthermore, the I register may be changed at random times by new interrupt-producing events without changing the selection of a set of operational registers in the middle of an instruction cycle.

The operation registers contained in the core storage include for each interrupt level: four 7-bit registers A0–A3, four 7-bit registers B0–B3, and a 14-bit program address register P comprised of two adjacent memory locations. The following table shows the memory addresses in octal for the registers individual to each interrupt level. Since twelve binary bits are required for each memory address, four octal digits (4 groups of three binary bits) are shown. The hyphen signifies inclusiveness.

| Address (octal) | Register | Interrupt Level (I Register) |
|---|---|---|
| 0000–0003 | A0–A3 | |
| 0004–0007 | B0–B3 | 0 (lowest priority). |
| 0100, 0101 | P | |
| 0010–0013 | A0–A3 | |
| 0014–0017 | B0–B3 | 1 |
| 0102, 0103 | P | |
| 0020–0023 | A0–A3 | |
| 0024–0027 | B0–B3 | 2 |
| 0104, 0105 | P | |
| 0030–0033 | A0–A3 | |
| 0034–0037 | B0–B3 | 3 |
| 0106, 0107 | P | |
| 0040–0043 | A0–A3 | |
| 0044–0047 | B0–B3 | 4 |
| 0110, 0111 | P | |
| 0050–0053 | A0–A3 | |
| 0054–0057 | B0–B3 | 5 |
| 0112, 0113 | P | |
| 0060–0063 | A0–A3 | |
| 0064–0067 | B0–B3 | 6 |
| 0114, 0115 | P | |
| 0070–0073 | A0–A3 | |
| 0074–0077 | B0–B3 | 7 (highest priority). |
| 0116, 0117 | P | |

From the above, it may therefore be seen that the particular A or B register selected during the execution of an instruction depends upon two factors, the first being the particular program of which the instruction is a part, and the second being the value of the $a$ or $b$ designator held by that instruction. Furthermore, each program has reserved to it a program address register P which sequentially supplies the addresses of the instructions to be executed in that program.

The I register further provides a priority determination when two or more interrupting events cause corresponding stages to be in a set condition at the same time. Consequently, only one program can control the computer at any one time, this normally being the one having the highest priority. The actual interrupting events used for setting stages of the I register may either be internal or external. For example, if the content of any one of the Delta registers in memory is decremented to zero (except Delta 0), then a particular stage in the I registers is set. On the other hand, the termination of an input-output data transfer between the computer and an external unit will also set a stage in the I register and cause the computer to execute a different program in response to said termination. Parts of an instruction itself can be used to set I register stages. Other interrupt producing events may be programmed or provided according to the particular environment in which the system finds itself.

The table below gives the basic instructions of the repertoire. The four-bit function code $f$ is given in octal notation, with bits 10–12 comprising the lower order. Other symbol notations used are the following:

( ) = The "content" of the register or address within the parentheses.

$Aa$ = The accumulator register specified by the designator $a$ and the controlling interrupt level.

$Bb$ = The extended address register specified by the designator $b$ and the controlling interrupt level.

$Yb$ = The twelve-bit operand address whose lower six bits are the $y$ designator and whose upper six bits are the content (bits 0–5) of the $Bb$ register.

NI = Next Instruction.

$U_L$ = The lower order seven bits of U register.

| Function Code | Name | Description |
|---|---|---|
| 00 | Add | $(Aa)$ initial replaced by sum of $(Aa)$ and $(Yb)$. |
| 01 | Selective Complement. | Bit positions of $(Aa)$ corresponding to "1's" in $(Yb)$ are complemented. |
| 02 ($a=\phi$) | Add 1, Compare | Increase $(Yb)$ by 1, if result is more positive than $Aa$, skip NI. |
| 02 ($a=1$) | Add 1 | Increase $(Yb)$ by 1. |
| 02 ($a=2$) | Test Even Parity | Skip NI if $(Yb)$ has even parity. |

| Function Code | Name | Description |
| --- | --- | --- |
| 02 (a=3) | Test Odd Parity | Skip NI if (Yb) has odd parity. |
| 03 | Compare | Skip NI if (Aa)=(Yb). |
| 04 | Complement | Replace (Aa) with complement of (Yb). |
| 05 | Logical Product | Replace (Ao) with logical product of (Aa) and (Yb). |
| 06 | Enter Accumulator | Replace (Aa) with (Yb). |
| 07 | Index Skip | Skip NI if (Aa)=(Yb); otherwise, add 1 to (Aa). |
| 10 | Enter Channel 1 | Enter Channel 1 with (Yb) and initiate I/O function according to a. |
| 11 | Enter Channel 2 | Enter Channel 2 with (Yb) and initiate I/O function according to a. |
| 12 | Store Channel 1 | Store Channel 1 at Yb and test for skip according to Ch. 1 parity and a. |
| 13 | Store Channel 2 | Store Channel 2 at Yb and test for skip according to Ch. 2 parity and a. |
| 14 (a=φ) | Enter I | Selectively set bits of I register corresponding to 1's of ($U_L$). |
| 14 (a=1) | Enter I | Selectively clear bits of I register corresponding to 0's of ($U_L$). |
| 14 (a=2) | Enter B | Six bits of (Yb) to lower six bits of Bb; 0 to high order bit of Bb. |
| 14 (a=3) | Enter B | Six bits of (Yb) to lower six bits of Bb; 1 to high order bit of Bb. |
| 15 | Store Accumulator | Store (Aa) and Yb. |
| 16 (a≠3) | Repeat | If NI is repeatable, non-I/O instruction, repeat it "by" times. If NI is Enter Channel 1 or Enter Channel 2, establish Buffer transfer of "by" words. |
| 16 (a=3) | Buffer Active Jump | If buffer is completed as denoted by Rk=0, jump to Yb. |
| 17 (a=φ, b≠0) | | Jump unconditionally to Yb. |
| 17 (a=φ, b=φ) | | Jump unconditionally to Yb, then clear currently used bit of I register. |
| 17 (a≠φ) | | If (Aa)>(Ao), jump to Yb. |

Figure 2A:
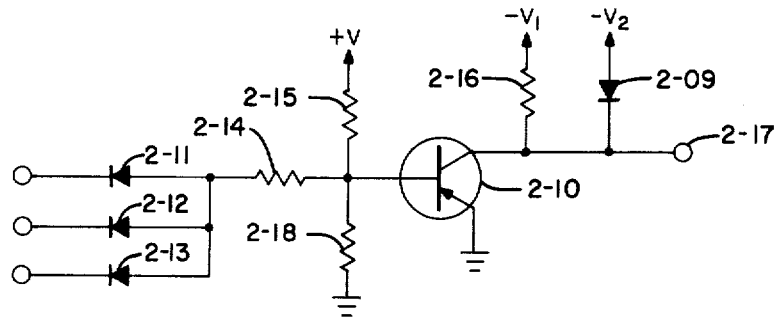

FIGURES 2a through 2g show the various symbols used for the logical components in the succeeding figures. The basic logical building block is that shown in FIGURE 2a which is comprised of a PNP transistor 2–10 having base input and collector output. This circuit can have one or more input terminals, with three being illustrated in FIGURE 2a. If any one of the input diodes 2–11 through 2–13 is rendered conducting by means of a relatively low signal applied to its input terminal, the current flow through resistors 2–14 and 2–15 makes the base of transistor 2–10 lower in potential than its emitter. This thereupon causes collector current flow through resistor 2–16 so as to produce a relatively high signal at output terminal 2–17. The diode 2–09 serves to clamp the output at a predetermined threshold in the absence of an input singal. However, if each of the input diodes is biased to a non-conducting condition by means of a relatively high signal applied to its respective input terminal, the transistor base becomes higher than its emitter and thus cuts off collector flow. This results in a relatively low potential appearing at the output terminal 2–17. Consequently, the basic circuit in FIGURE 2a acts as an AND-Inverting circuit in that it produces a relatively low output signal when all of its inputs are high. When used in this respect, the circuit detects the concurrent application of high signals to all of its inputs and is given the symbol shown in FIGURE 2b. On the other hand, the basic circuit in FIGURE 2a produces a relatively high output signal when any one or all of its input signals is low. Thus, it provides an OR function with respect to detecting relatively low input signals. When the basic circuit is used in this manner, the symbol is as shown in FIGURE 2c. If only one input terminal is provided to the circuit, it acts merely to invert the input signal with this function being represented by the legend in FIGURE 2d. In the succeeding drawings, input leads may actually be shown applied to two or more sides of the block enclosing the logical symbol.

Figure 2E:
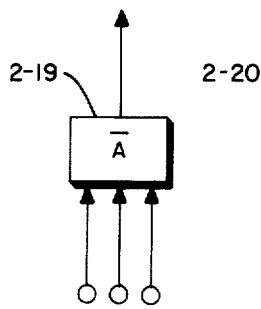
Figure 2E:
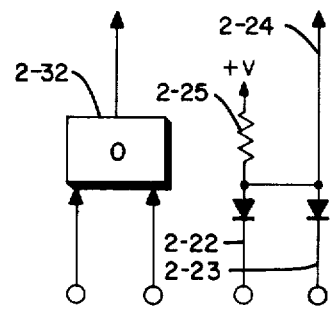

A diode OR gate is also used in some of the figures to buffer together the outputs from several Ā gates. This gate has the block legend 2–21 and circuit configuration as shown in FIGURE 2e. Two or more input diodes 2–22 and 2–23 have anodes connected to junction 2–24. A resistor 2–25 is connected between junction 2–24 and a source of +V. The pontetial at junction 2–24 follows the potential of the lowest signal applied to the input diodes so that the circuit acts to generate a low output for any low input.

Figure 2F:
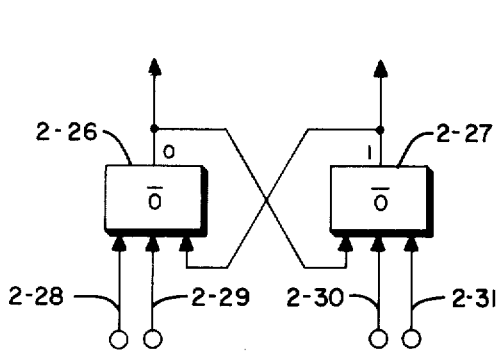

Two O gates 2–26 and 2–27 cross-coupled in the fashion shown in FIGURE 2f provide a bistable flip-flop stage. Such a combination may be switched from one state to the other by the application of a low signal to an input. For example, initially assume that the combination of FIGURE 2f is in a state such that the output of Ō2–26 is high and the output of Ō2–27 is low. The signals applied to all input terminals 2–28 through 2–31 are high. The low output of O2–27, when applied to one input of O2–26, maintains the latter's output high. The high output from Ō2–26, when coupled with the high inputs on terminals 2–30 and 2–31, maintain the output of O2–27 at its low value. This potential state of the circuit is therefore stable and can be altered only by applying a low signal to either one or both of the input terminals 2–30 or 2–31 of O2–27. When this occurs, the output of O2–27 becomes high. The high output of O2–27 is applied to one input of O2–26 whose other inputs are still high at this time. Consequently, the output of O2–26 goes low to thereby keep O2–27 high. The signal on input 2–30 can now become high without destroying the high output from O2–27, since this gate still receives a low input from the output of O2–26. In order to once again generate a high output from O2–26, a low input must be applied to either one of the inputs 2–28 or 2–29.

Figure 2G:
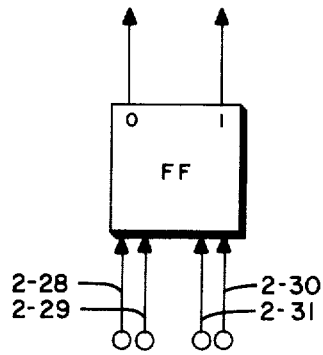

Instead of showing each flip-flop stages as a combination of two O gates, the succeeding drawings use the symbol of FIGURE 2g. In order to define the two different bistables states, a 0 and a 1 value may be assigned to the outputs, such that a flip-flop may either be in a 0 condition (clear) or a 1 condition (set) depending upon the output terminal generating the high signal.

Figure 3A:
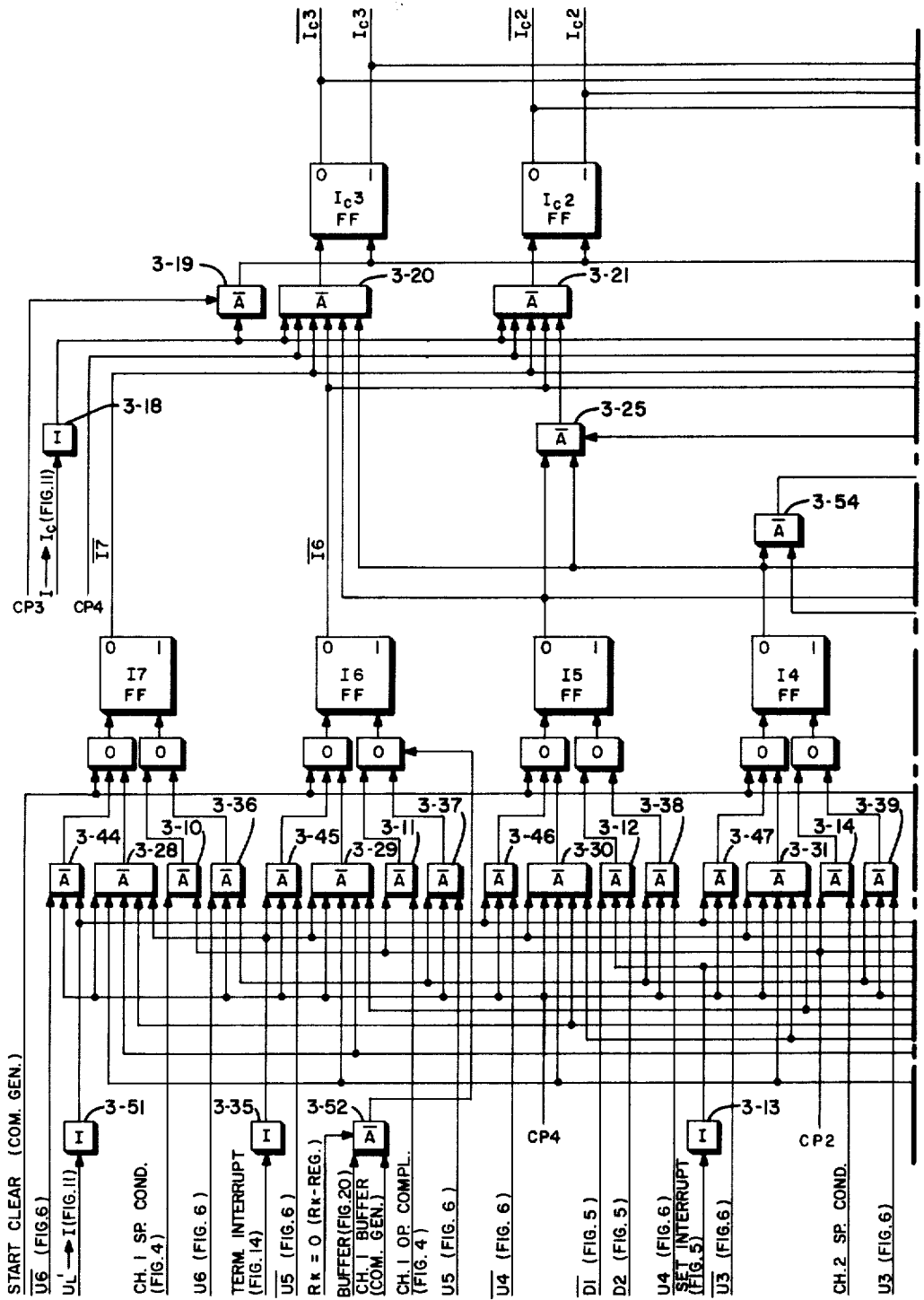
FIGURES 3a and 3b show details of the interrupt status register.
Figure 3B:
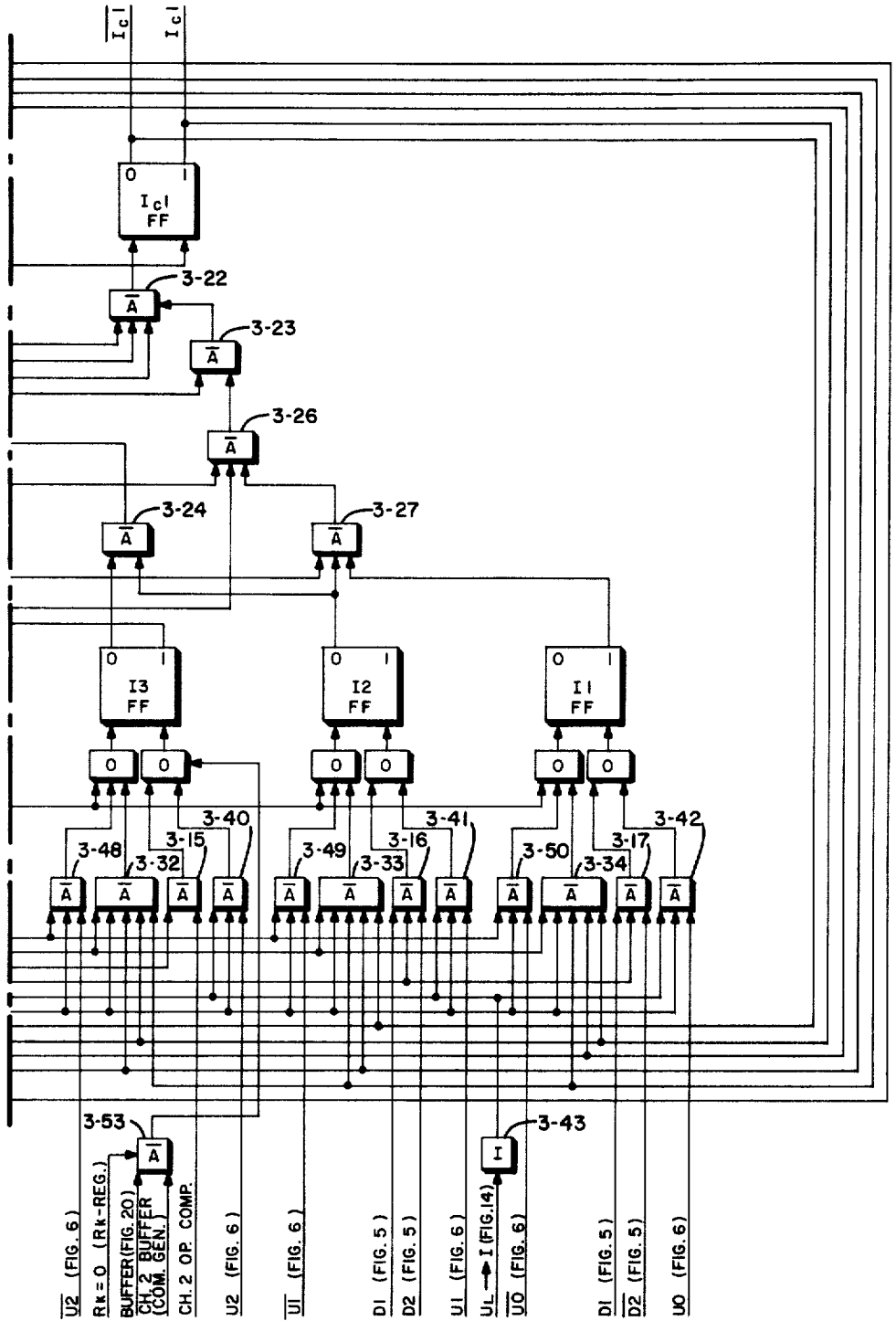

FIGURES 3a and 3b show details of the interrupt status (I) register which comprises part of the present invention. In the disclosed embodiment, the I register is made up of seven flip-flop stages designated $I_1$ through $I_7$ which are used for switching among eight possible interrupt levels. The occurrence of any one of seven different interrupt producing events (the lowest level priority does not produce an interrupt) sets a corresponding bit of the I register. Also included in FIGURE 3 is the $I_C$ register which has three flip-flop stages for generating a binary coded character in response to the highest priority stage in the I register which has been set. At the start of any instruction cycle, the $I_C$ register is used to provide an address prefix which is employed to help access the operational registers P, A and B for that instruction. This novel structure thus allows a computer control to be switched randomly among eight major routines without any danger of a routine "losing step," or of the operational registers of any routine being affected by another.

As mentioned above, the system in which the present invention finds particular use provides for eight priority levels or interrupt producing events which are listed as follows, commencing with the highest priority.

(1) Interrupt 7. The signal Channel 1 Special Condition is generated from FIGURE 4 and clocked at CP2 at Ā3–10 whose output sets I7. This signal occurs whenever an unsolicited or unexpected I/O operation, such as "external function" or "alternate condition," is produced from the real time computer communications terminal unit interface logic.

(2) Interrupt 6. The signal Channel 1 Operation Complete appears at $\overline{A}3$–11 and is clocked by CP2 to set I6 whenever a programmed data transfer over channel 1 is complete and a program can consequently initiate a subsequent data transfer. During buffer operation on channel 1, the content of $R_k$ is decremented to 0 when the last word is transferred so that $\overline{A}3$–52 sets I6.

(3) Interrupt 5. When the millisecond clock associated with level 5 has counted down to zero, stage I5 is set by an output from $\overline{A}3$–12. $\overline{A}3$–12 is enabled in part by the command Set Interrupt (applied via I3–13) which indicates that a zero count has been detected in the clock register. Furthermore, both the signals $\overline{D}_1$ and $D_2$ are high to represent that the level 5 millisecond clock is being checked. It will be noted that the conditioning signal from I3–13 is also applied to other $\overline{A}$ gates whose function will be described subsequently.

(4) Interrupt 4. Stage I4 is set at CP2 from $\overline{A}3$–14 whenever the signal Channel 2 Special Condition occurs, which has the same significance with respect to channel 2 as has the Channel 1 Special Condition signal with respect to channel 1.

(5) Interrupt 3. Stage I3 is set at CP2 from $\overline{A}3$–15 whenever a programmed data transfer operation is complete on channel 2, as indicated by the signal Channel 2 Operation Complete. During buffer operation on Channel 2, $R_k$ is decremented to 0 for the last word transfer so that $\overline{A}3$–53 sets I3.

(6) Interrupt 2. Whenever the millisecond clock associated with this level is checked for zero content and such is found, $\overline{A}3$–16 has applied thereto all high inputs which in turn set stage I2. The identity of this clock is indicated by the high signals $D_1$ and $D_2$, whereas the zero content is indicated by the command Set Interrupt applied via I3–13.

(7) Interrupt 1. In similar fashion as Interrupts 5 and 2, the decrementing to zero of the millisecond clock associated with this interrupt level causes $\overline{A}3$–17 to set stage I1. Positive signals D1 and $\overline{D}2$ identify this particular clock, while the command Set Interrupt indicates a zero content. In retrospect, it should be appreciated that it is impossible to enable simultaneously all of the $\overline{A}$ gates 3–12, 3–16, and 3–17 since each has a different combination of the D1 and D2 signals.

(8) Interrupt 0. This priority level is the lowest of the eight, and there is no stage in the I register associated therewith. Consequently, if all I register stages are cleared, then the computer control operates on level 0.

At the start of an instruction cycle, the $I_C$ register stages are normally placed into a condition according to the highest priority I register stage which is by then set. Stages $I_C1$, $I_C2$, and $I_C3$ generate signals representing the highest priority set interrupt level in binary coded fashion. Whenever it is necessary to place the $I_C$ register into this condition, the command I To $I_C$ is generated and applied I3–18 to $\overline{A}3$–19, and to $\overline{A}$ gates 3–20, 3–21, and 3–22. While this command is present, $\overline{A}3$–19 sets all of the $I_C$ stages at CP3. At the next following CP4, $\overline{A}$ gates 3–20, 3–21, and 3–22 are conditioned to sense the status of the I register and to thereby clear the proper $I_C$ stages so that the final condition of the $I_C$ register generates the binary coded character. For example, if stage I7 is set, thus indicating interrupt level 7, the signal $\overline{I}7$ is low which will thus prevent the enabling of any of the $\overline{A}$ gates 3–20 through 3–22. Therefore, since stages $I_C1$ through $I_C3$ are initially set to binary 1, their condition remains unchanged even upon application of the command I To $I_C$ and CP4. Consequently, output signals $I_C1$, $I_C2$, and $I_C3$ are high to thereby represent the binary coded character 111 which has an octal value of 7. On the other hand, assume that only stage I6 is set in the I register. In this case, $\overline{I}6$ is low and $\overline{I}7$ is high since it is assumed that stage I7 is now clear. The low $\overline{I}6$ prevents either one of the gates $\overline{A}3$–20 and $\overline{A}3$–21 from generating a low signal to clear either $I_C3$ or $I_C2$, respectively. $\overline{I}6$ is also applied to $\overline{A}3$–23 which in turn applies a high signal to $\overline{A}3$–22. Since $\overline{I}7$ is high, this $\overline{A}$ gate is enabled to clear $I_C1$. Consequently, the status of the $I_C$ register is 110 which indicates octal 6 in the binary code.

The clearing of the proper $I_C3$ stages from any of the other set I register stages follows along the lines indicated above. As a further example, if only I3 is set, then $\overline{A}3$–24 output is high. Because I5 and I4 are assumed here to be clear, $\overline{A}3$–25 has all high inputs thereto which produces a low output to $\overline{A}3$–21. $\overline{A}3$–21 is thus prevented from clearing $I_C2$. On the other hand, $\overline{A}3$–20 has all high inputs since all of the stages I4 through I7 are considered clear at this time. $I_C3$ will consequently be cleared. Since I3 is set and I4 is clear, $\overline{A}3$–54 produces a low output which in turn makes high the output of $\overline{A}3$–26. I6 is clear so that $\overline{A}3$–23 output is low, which thus prevents the enabling of $\overline{A}3$–22 and so leaves stage $I_C1$ in its set condition. The $I_C$ register configuration is now 011 which indicates interrupt level 3.

One more example should suffice in understanding the clearing of $I_C$ register stages according to set I register stages. If only I1 is set, then $\overline{A}3$–27 produces a low output which makes high the output of $\overline{A}3$–26. This high output, coupled with the high $\overline{I}6$, makes $\overline{A}3$–23 negative and thus prevents the clearing of $I_C1$. Since I2 and I3 are clear, $\overline{A}3$–24 is low which makes high $\overline{A}3$–25. I6 and I7 are also clear so that $\overline{A}3$–21 is enabled to clear $I_C2$. In like fashion, $\overline{A}3$–20 has all high inputs and thus clears $I_C3$, leaving an $I_C$ register configuration of 001. If none of the I register stages are set, then it will also be appreciated that all of the gates $\overline{A}3$–20 through $\overline{A}3$–22 are enabled to produce low outputs which in turn clear all of the $I_C$ register stages.

As has been seen above, the register I is set randomly by the occurrence of an interrupt producing event. If two or more events occur so that their corresponding bits of I are in a set condition at the same time, only the highest priority program can take control. This means that any subsequently occurring higher priority interrupting condition can take control from a previously initiated lower priority program. A change in priority programs usually occurs at the completion of an instruction cycle except for certain conditions subsequently to be described. Assume, for example, that only I3 is set and the current program is level 3. The content of I register at this time is 0000100. During the course of the level 3 program the interrupt producing event for level 2 may occur. At this time the I register changes to 0000110 since stage I2 is also now set. However, the level 3 program remains in control if it contains instructions remaining to be executed since the set condition of stage I3 maintains the $I_C$ register configuration 011, notwithstanding the fact that stage I2 is also now set. Moments later, while a level 3 program instruction is being executed and both I3 and I2 are set, assume that the interrupt producing event for level 6 occurs. The I register becomes 0100110, and the computer control is automatically switched to the level 6 program immediately following the execution of the level 3 instruction provided that it is a non-skip, non-jump, or non-repeat function code. The $I_C$ register configuration for level 6 control is 110, which is obtained due to the set condition of stage I6 even though stages I3 and I2 are also set. That this is so may be observed from the fact that the low signal $\overline{I}6$ prevents either $\overline{A}3$–20 or $\overline{A}3$–21 from generating a clear signal to its respective $I_C$ stage. Furthermore, the low $\overline{I}6$ signal produces a high output from $\overline{A}3$–23 which, when coupled with the high $\overline{I}7$ signal from stage 17, enables $\overline{A}3$–22 to clear $I_C1$. Thus, the set stages I3 and I2 have no control over the configuration of the $I_C$ register at this time.

At the conclusion of execution of the complete program at any one of the priority levels, the I register stage set for that program is now cleared so that control can be returned to the next highest set priority level. A group of $\overline{A}$ gates 3–28 through 3–24 is provided for determining the configuration of the $I_C$ register. For example, $\overline{A}3$–28 has inputs from the 1 output terminals of stages $I_C3$, $I_C2$, and $I_C1$ so that the $I_C$ register configuration of 111 will permit the enabling of $\overline{A}3$–28 upon the occurrence of a certain condition. The remaining $\overline{A}$ gates 3–29 through 3–33 are likewise each responsive to a different combination of the $I_C$ register stages to allow each to clear its associated I register stage upon the conclusion of a program being executed at that level. The actual clearing of an I stage occurs upon the generation of the command Terminate Interrupt applied via I3–35. This command is generated in response to the execution of a Jump instruction having a function code of 17 and with $a$ and $b$ both equal to 0. Such an instruction is provided at the end of each program in each interrupt level. As an illustration of this, assume in the above example that the program at level 6 is completed with a Jump instruction having its $a$ and $b$ designators both equal to 0. The command Terminate Interrupt is generated and applied simultaneously to all of the $\overline{A}$ gates 3–28 through 3–34. However, since the $I_C$ register has the configuration 110, only $\overline{A}3$–29 is enabled at CP4 to thereupon clear stage I6. Stages I3 and I2 remain set, with the result that $I_C$ is changed to 011 and the program in level 3 is again resumed. If there is no setting of any higher level priority stage in the I register from this point onward, the instructions remaining in the level 3 program are executed. The last instruction in this program is also a Jump function with $a$ and $b$ equal to 0, which thereupon causes the generation of the command Terminate Interrupt. At this time the $I_C$ configuration of 011 allows only $\overline{A}$ gate 3–32 to be enabled. The low signal from its output thereupon clears stage I3, leaving only stage I2 in a set condition. Therefore, the $I_C$ register configuration changes to 0000010 and the program in level 2 takes control. If there are no higher priority interrupt producing events occurring during execution of the level 2 program, it is completed with a final Jump instruction which, when executed, generates again the command Terminate Interrupt. $\overline{A}3$–33 at this time is enabled because of the 010 configuration in $I_C$ register so as to clear stage I2. With all of the I register stages now clear, the $I_C$ register is set to the value 0000000 which identifies the level 0 program. Consequently, the program associated with priority level 0 is now executed to completion without delay unless some I stage is set by an interrupt producing event of higher priority.

The present embodiment also makes provision for changing the status of the I register by means of an instruction currently being executed. For example, the $y$ designator and lower order bit of the $b$ designator of an instruction word may be used to set the I stages according to the binary 1 bits contained therein. $\overline{A}$ gates 3–36 through 3–42 each is responsive to a different stage in the $U_L$ register. Upon generation of the command $U_L$ To I applied via I3–43, those $\overline{A}$ gates 3–36 through 3–42 which sample a 1 bit in their corresponding U stage will thereupon set their associated I stage to a 1 value. Command $U_L$ To I is generated when the function code of the instruction word is equal to 14 and the $a$ designator is equal to 00. On the other hand, it may be desired to transfer the 0 bits in $U_L$ to the I register instead of its 1 bits. $\overline{A}$ gates 3–44 through 3–50 are responsive to 0 bits from $U_L$ upon the generation of the command $U'_L$ To I applied via I3–51, which occurs for $f=14$ and $a=1$.

Figure 4:
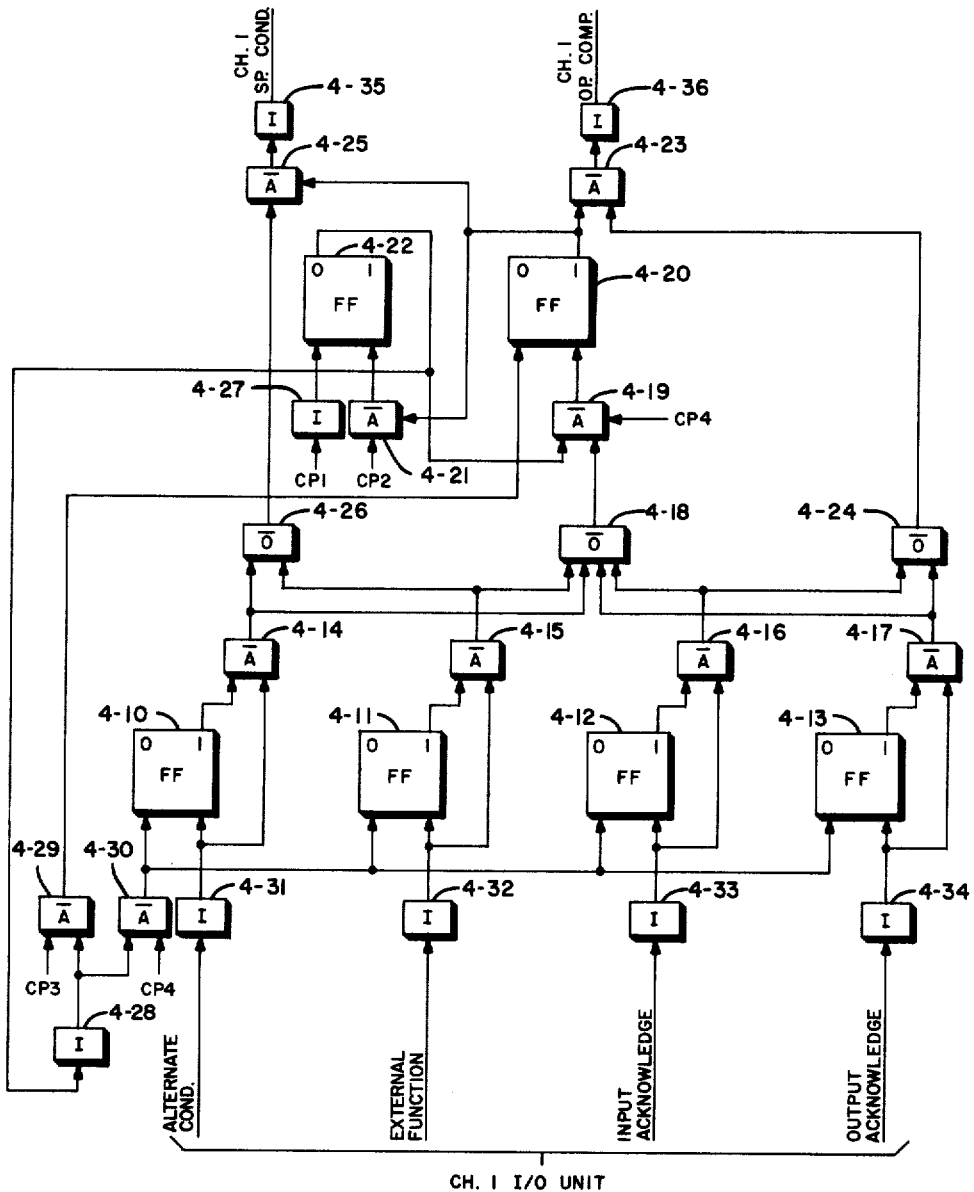
FIGURE 4 shows circuitry for generating certain input-output interrupting event signals.

FIGURE 4 illustrates the Channel 1 control for generating this signals Channel 1 Special Condition and Channel 1 Operation Complete which are applied to the I register in FIGURE 3. Flip-flops 4–10 through 4–13 are provided to store indications derived from the external I/O equipment. The potentials on the incoming lines from external units to I gates 4–31 through 4–34 normally are high so as to set all of the associated flip-flops 4–10 through 4–13. These flip-flops, when set, apply high potentials to one input of their associated $\overline{A}$ gates 4–14 through 4–17. However, as long as I gates 4–31 through 4–34 remain low, these $\overline{A}$ gates cannot be enabled. When a low significant signal is applied to any one of the input I gates, its output becomes high to thereby enable a low output from the associated one of the $\overline{A}$ gates 4–14 through 4–17. For example, if a Channel 1 external unit generates a low signal Alternate Condition or External Function, then $\overline{A}4$–14 or $\overline{A}4$–15 is enabled, respectively. During programmed data transfer of one word on Channel 1, a low signal Input Acknowledge or Output Acknowledge is generated depending upon the direction of transfer in order to thereby enable $\overline{A}4$–16 or $\overline{A}4$–17, respectively.

When any one of the $\overline{A}$ gates 4–14 through 4–17 goes low, $\overline{O}4$–18 produces a high signal which is applied to one input of $\overline{A}4$–19. Normally, flip-flops 4–20 and 4–22 are in their clear condition. If FF4–22 is clear, and $\overline{O}4$–18 produces a high output, $\overline{A}4$–19 is enabled at CP4 to set FF4–20. FF4–20 when set applies a high signal to one input of each of the $\overline{A}$ gates 4–23 and 4–25. It also applies a high signal to $\overline{A}4$–21 which is enabled at the next following CP2 time to set FF4–22. If the set condition of FF4–12 or 4–13 is responsible for the setting of FF4–20, then $\overline{O}4$–24 produces a high output which enables $\overline{A}4$–23, via I4–35, to produce a high signal Channel 1 Operation Complete which is applied to the I register in FIGURE 3 in order to set I6. On the other hand, if either FF4–10 or 4–11 is set, then $\overline{O}4$–26 produces a high signal which enables $\overline{A}4$–25, via I4–36, to generate the high signal Channel 1 Special Condition.

Since FF4–22 is set at CP2, I4–28 is high to thereby cause the enabling of $\overline{A}4$–29 and $\overline{A}4$–30 at the next following CP3 and CP4, respectively. The former clears FF4–20, while the latter clears that flip-flop of the group 4–10 through 4–13 which has the low significant input signal. Said cleared flip-flop cannot be set until its input signal goes high once more. Thus, since any of the four inputs may, upon switching low, persist in this condition for an indefinitely long period of time, the arrangement in FIGURE 4 insures response once and only once to each negative going swing.

Although not shown in detail, circuitry similar to that of FIGURE 4 is provided to generate the Channel 2 Special Condition and Channel 2 Operation Complete signals.

Figure 5:
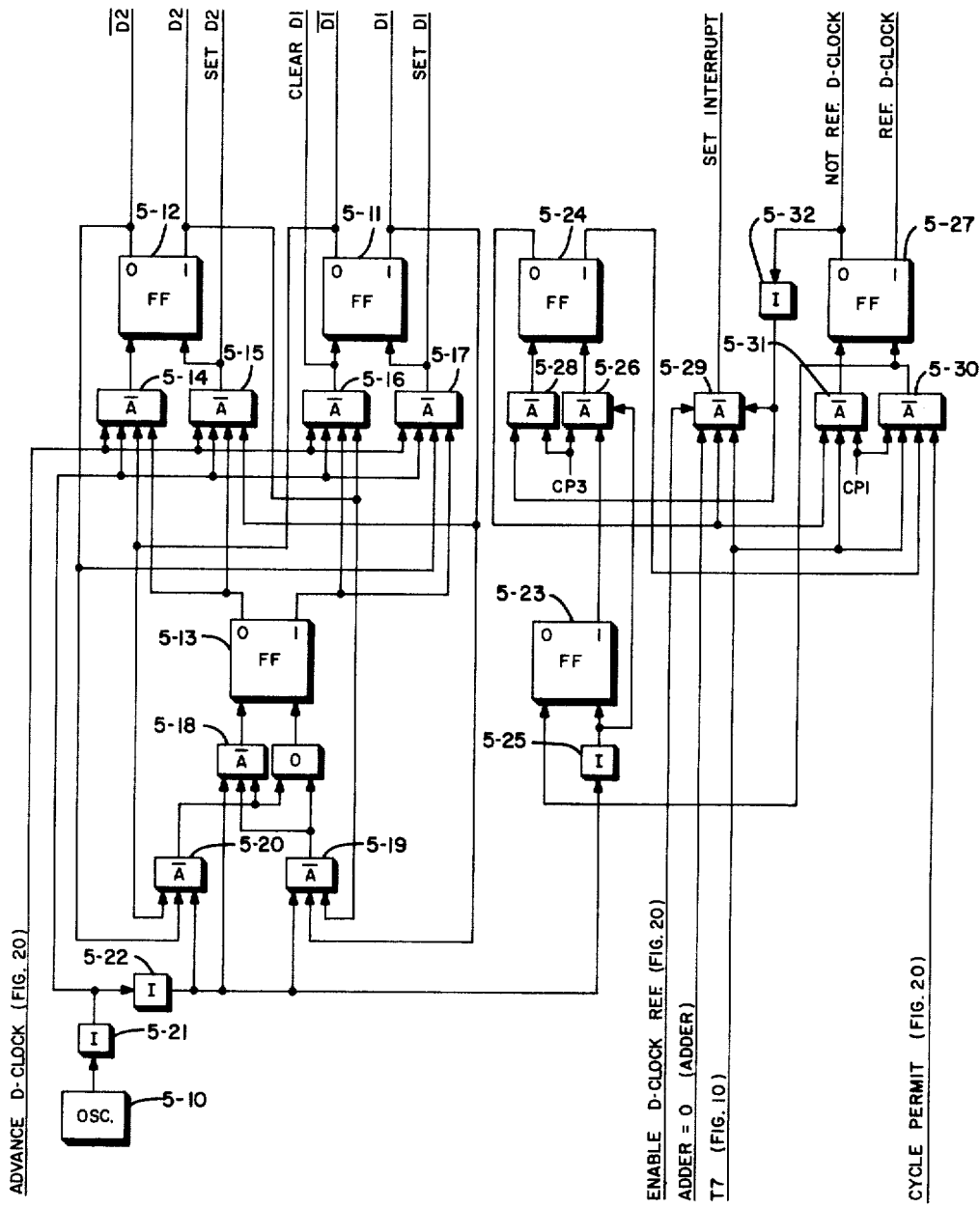
FIGURE 5 shows D-clock control circuitry.

FIGURE 5 shows details of the D-clock control for decrementing the count in each of the four 1 millisecond Delta memory registers 0, 1, 2, and 5. A square wave oscillator 5–10 operates at 4096 cycles per second. A different one of the memory clock registers is decremented by 1 at each cycle. This implies that a clock may be decremented 1024 times per second. For reference purposes, the clocks are designated as Delta 0, Delta 1, Delta 2, and Delta 5 with the numeral referring to the interrupt level set when the clock register value is 0. When Delta 5 register, for example, is counted down to 0, stage I5 in the I register of FIGURE 3 is set to 1, and any program of priority level less than 5 is interrupted. However, when Delta 0 register counts down to 0, no interrupt level is set since this indicates a fault in the machine which is taken care of by the operator.

The Delta clock registers are located at the following addressable memory locations given in octal:

| Clock | Mem. Address |
|---|---|
| Delta 0 | 0120 |
| Delta 1 | 0121 |
| Delta 2 | 0122 |
| Delta 5 | 0123 |

These clock registers, of course, hold seven bits each. Each can be set to any positive number less than or equal to 100 (octal) by using an Enter A (function 06) instruction and then a Store A (function 15) instruction. When the control of FIGURE 5 indicates that a clock register should be updated (decremented), 1 is subtracted from the clock register content. If the difference is 0, then the stage in register I corresponding to the clock is set to 1. If the difference is not 0, then no interrupt set occurs. However, if the difference is negative, then —0 is stored in the memory register, and no interrupt occurs. This function is performed by circuitry not shown.

FIGURE 5 shows two flip-flops 5–11 and 5–12 which acts together as a two-stage counter in order to specify which Delta clock register is to be updated. Their outputs are used in FIGURE 3 as well as in the S register. With FF5–11 holding the least significant bit and FF5–12 holding the most significant bit, the counting sequence is as follows, assuming that said sequence commences with both flip-flops in a clear condition:

00 specifies Delta 0
01 specifies Delta 1
11 specifies Delta 2
10 specifies Delta 5

A third flip-flop 5–13 is also provided to aid in changing the states of flip-flops 5–11 and 5–12. Various $\bar{A}$ gates 5–14 through 5–20 are also provided to accomplish the counting function. The manner in which they operate is as follows. Initially assume that both FF5–11 and FF5–12 are clear so that the signals $\bar{D}1$ and $\bar{D}2$ are high. For these signals Delta 0 is specified. When oscillator 5–10 generates a high signal, I5–21 applies a low signal to $\bar{A}5$–14 through $\bar{A}5$–17 and thus prevents any change in the condition of the counting stages. However, the output from I5–21 is also inverted via I5–22 to thereby apply a high signal to one input of each of the $\bar{A}$ gates 5–18 through 5–20. Since both $\bar{D}2$ and $\bar{D}1$ are high, $\bar{A}5$–20 is enabled to set FF5–13. This applies a high signal to one input of each of the gates $\bar{A}5$–16 and $\bar{A}5$–17. When the output of oscillator of 5–10 next goes low, I5–21 goes high. This makes the output of I5–22 low so as to generate a high output from each of the gates $\bar{A}5$–18 through $\bar{A}5$–20 and thus prevent a change in the state of FF5–13 as long as oscillator 5–10 is in its negative half cycle. The command Advance D Clock is generated by control circuitry sometime during the negative half cycle of the oscillator to apply a high signal to one input of each of the gates $\bar{A}5$–14 to 5–17, each of which also has another high input from the output of I5–21. However, of these four gates, only $\bar{A}5$–17 has high signals to all of its inputs since $\bar{D}2$ is high and since only the 1 output terminal of FF5–13 is producing a high signal. Consequently, at the time of the command Advance D Clock, $\bar{A}5$–17 sets FF5–11 such that the counter configuration now becomes 01 which designates Delta 1.

On the next following positive half cycle of oscillator 5–10, I5–21 goes low, thus disabling $\bar{A}$ gates 5–14 through 5–17. The output from I5–22 again goes high. Since FF5–11 is set and FF5–12 remains clear during this positive half cycle, neither $\bar{A}5$–19 nor $\bar{A}5$–20 can be enabled since neither has high signals to all of its inputs. Consequently, both produce high outputs which, when coupled with the high output from I5–22, enables $\bar{A}5$–18 to clear FF5–13. Hence, when oscillator 5–10 again generates its negative half cycle, $\bar{A}5$–15 (upon application of the command Advance D Clock) is enabled to set FF5–12 because of the high inputs provided by the high signal D1 and the high output from the 0 terminal of FF5–13. The count changes from 01 to 11, which identifies clock Delta 2. When the oscillator 5–10 again produces a positive half cycle, FF5–13 is once more set by operation of $\bar{A}5$–19 which now is responsive to the high signals D1 and D2. Consequently, upon oscillator 5–10 again becoming negative, $\bar{A}5$–16 is enabled to clear FF5–11 and change the count from 11 to 10 (Delta 5). During the next positive half cycle of oscillator 5–10, $\bar{A}5$–18 is once again enabled to clear FF5–13, so that upon the subsequent negative half cycle of oscillator 5–10, $\bar{A}5$–14 is enabled to clear FF5–12 and once again return the count to the initial starting point of 00.

FIGURE 5 further shows three control flip-flops 5–23, 5–24, and 5–27 which are employed to initiate the sequence of operations which result in the generation of the command Advance D Clock. Normally, all of these flip-flops are clear. When oscillator 5–10 is in its positive half cycle, I5–25 generates a low output which sets FF5–23. The high signal from the 1 output terminal of FF5–23 is applied to $\bar{A}5$–26. However, $\bar{A}5$–26 cannot be enabled to set FF5–24 until oscillator 5–10 returns to its negative half cycle. This is because the output of I5–25 is also connected to $\bar{A}5$–26. When FF5–24 is set at CP3 following this change in oscillator polarity, its 1 output terminal signal goes high and its 0 output terminal signal goes low. Consequently, $\bar{A}5$–30 can become enabled at the next following CP1 if it also has applied to it high signals on its other input terminals. These other input signals to $\bar{A}5$–30 will be defined in subsequent paragraphs. The enabling of $\bar{A}5$–30 sets FF5–27 to generate the command Reference D Clock which goes to FIGURE 20 and results in the generation of the command Advance D Clock therefrom.

The low output from $\bar{A}5$–30 is also applied to clear FF5–23. When set, FF5–27 further supplies a high signal to $\bar{A}5$–28 via 5–32 so that FF5–24 is cleared at CP3 following the setting of FF5–27. Both of these flip-flops 5–23 and 5–24 remain clear until oscillator 5–10 once more goes high to thereby enable I5–25 to set FF5–23.

When FF5–27 is set and FF5–24 is clear, high signals are applied to two inputs of $\bar{A}5$–29. The other inputs of this $\bar{A}$ gate are responsive to a certain cycle time T7 and a command Cycle Permit to allow said $\bar{A}$ gate to generate a low command Set Interrupt if the output of the adder is equal to 0 during this time. The command Set Interrupt is applied to I3–13 in FIGURE 3.

Figure 6:
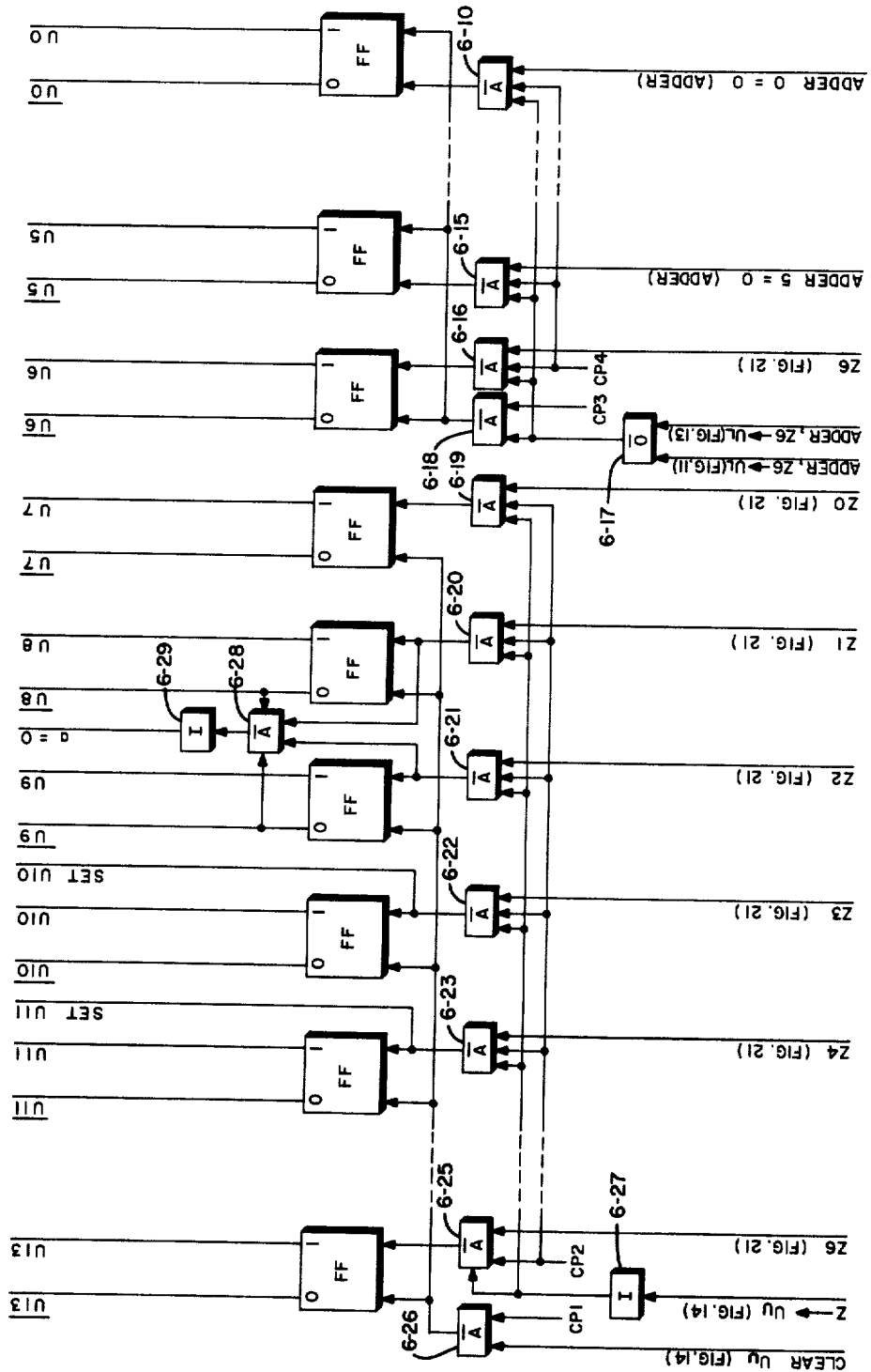
FIGURE 6 shows the U register which holds a currently executed instruction.

FIGURE 6 shows the U register which stores each 14-bit instruction word currently being executed. Stages 0 through 5 contain the y designator, 6 and 7 the b designator, 8 and 9 the a designator, and 10 through 13 the function code f. For convenience, the seven lower order stages 1 through 6 are termed $U_L$ while the seven higher order stages 7 through 13 are termed $U_U$. Stages 1 through 5 of $U_L$ are loaded from the adder, and stage 6 is loaded from stage 6 of the Z register. This loading into $U_L$ occurs via set of $\bar{A}$ gates 6–10 through 6–16, some of which are omitted in FIGURE 6 for the sake of space. The gating through these $\bar{A}$ gates occurs if either one of the two commands Adder, Z6 to $U_L$ is applied to $\bar{O}6$–17. The high output from $\bar{O}6$–16 first enables $\bar{A}6$–18 to set stages U0 through U5 to 1's and to clear U6. At CP4 next following, $\bar{A}6$–10 through 6–15 are conditioned to respond to 0 bit outputs from the adder in order to clear those stages U0 through U5 in accordance with the 0 bits produced from the adder. $\bar{A}6$–16 is responsive to a 1 bit in Z6 to set U6.

Stages U7 through U13 ($U_U$) may be loaded from the

Z register via a set of $\overline{A}$ gates 6-19 through 6-25 upon the generation of the command Z to $U_U$. This command also conditions $\overline{A}$6-26 to first clear $U_u$ at CP1, followed by the transfer of the Z register content at the next following CP2 via the aforementioned $\overline{A}$ gates.

For certain functions it is necessary to indicate when the $a$ designator is equal to 0. This is accomplished by $\overline{A}$6-28 which is enabled only when both stages U8 and U9 are clear. The output from $\overline{A}$6-28 in turn is inverted by I6-29 to generate the high output $a=0$.

Figure 7:
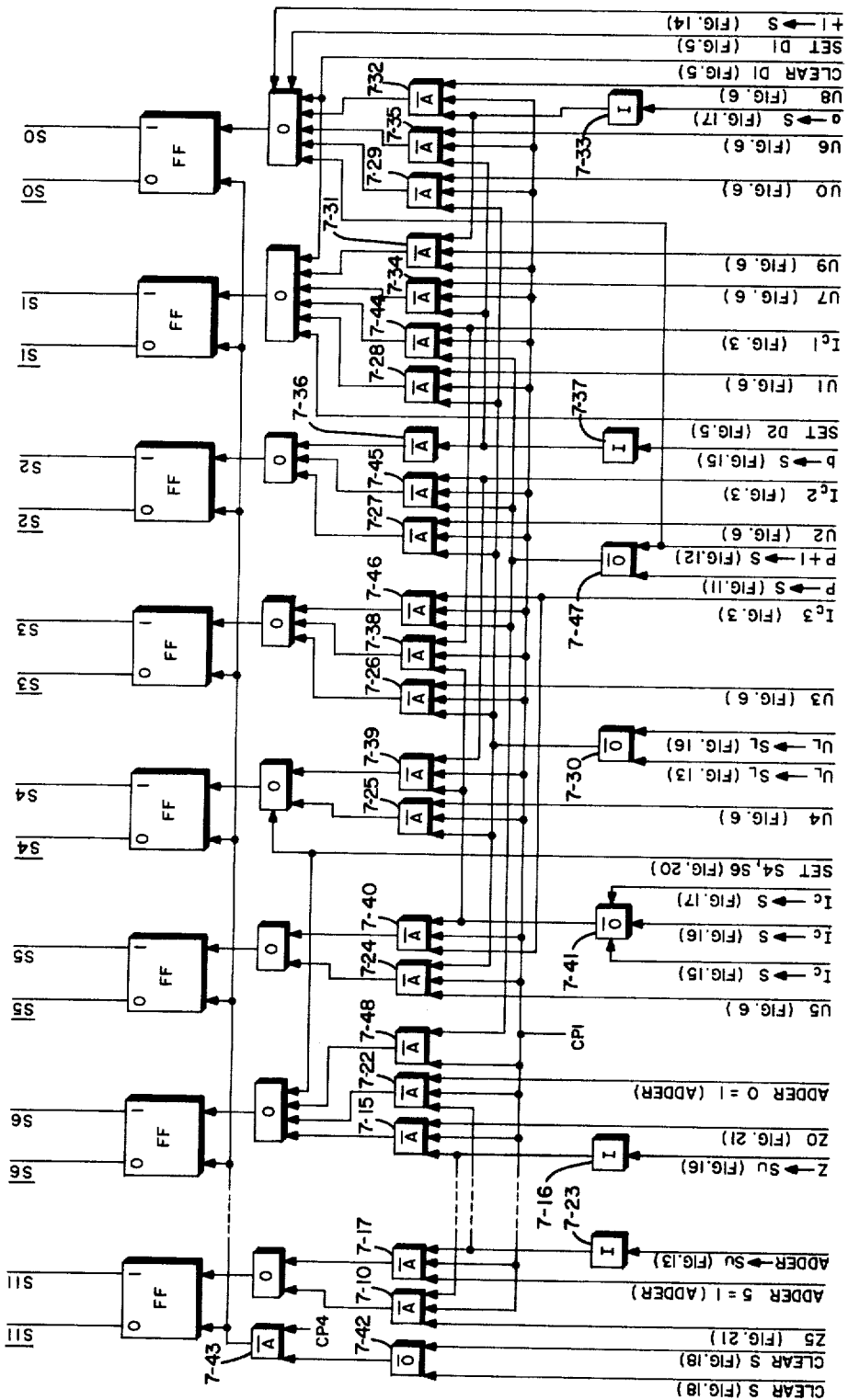
FIGURE 7 shows the memory address register which is used to access the internal memory at some particular location.

FIGURE 7 shows details of the S register which holds a twelve-bit address used for referencing memory. This register is conveniently divided into two parts, $S_L$ (stages S0 through S5) and $S_U$ (stages S6 through S11). Information is entered into the S register from various sources. A set of $\overline{A}$ gates 7-10 through 7-15 is used to transfer information from the Z register into the $S_U$ register upon application of the command Z To $S_U$ at CP1. $\overline{A}$ gates 7-17 through 7-22 likewise enter a 6-bit value appearing at the output of adder stages 0 through 5 into the $S_U$ register upon appearance of the command Adder To $S_U$. $\overline{A}$ gates 7-24 through 7-29 are conditioned to pass the content $U_L$ (stages 0 through 5), into $S_L$ upon generation of a command $U_L$ to $S_L$.

Means are also provided to transfer the $a$ and $b$ designators of the instruction word into the $S_L$ register. $\overline{A}$ gates 7-31 and 7-32 are enabled by the command $a$ To S to respond to the values in U9 and U8, respectively, to transfer the $a$ designator into S1 and S0, respectively. Thus, these two S register stages can be set to any one of the binary configurations 00, 01, 10 or 11 which, if S2 is clear, respectively represent octal values of 0, 1, 2 and 3. $\overline{A}$ gates 7-34 and 7-35 are responsive to the $b$ designator bits in U7 and U6 for transferring same to stages S1 and S0 upon application of the command $b$ To S. This command also enables I7-36 to set stage S2 so that the 3-bit value placed into $S_L$ at this time will have a binary bit configuration of either 100, 101, 110, or 111 (4, 5, 6 or 7 octal).

When a memory reference is initiated for the A or B register during execution of the current instruction word, the address of said register is always modified by the interrupt level whose program is then controlling the operation. The content of the $I_C$ register is transferred to $S_L$ by $\overline{A}$ gates 7-38, 7-39 and 7-40 to set stages S3, S4 and S5 to the highest priority interrupt. Consequently, the $a$ or $b$ designator transferred to stages S0 through S2 is always accompanied by transfer of $I_C$ to stages S3 through S5, so that the $A_1$ register reference during interrupt level 2, for example, has a different address from the $A_1$ register referenced during interrupt level 5. For example, assume that the $a$ designator for an instruction has the binary bit value of 01, and that said instruction occurs in the programs of both interrupt level 2 and interrupt level 5. When executed during interrupt level 2, a transfer of $a$ to S sets stages S1 and S0 in the configuration 01, while the transfer of $I_C$ to stages S5, S4, and S3 places them in a bit configuration of 010 (octal value 2). Thus, since stages S2 and S6 through S11 remain clear (because the S register is initially cleared by a signal applied to $\overline{O}$7-42 and gated by $\overline{A}$7-43), the memory address held in S register is 0022 (octal). However, if an instruction with this same $a$ designator is executed during interrupt level 5, the memory address of the A register is 0052 because of the octal value of 5 in $I_C$ which is transferred to stages S3 to S5 for this priority level. Thus, the value held in $I_C$ addresses an operational A or B register which is individual to the priority level having control, and which differs from an operational register used during a dfferent priority program even though the $a$ or $b$ designators are identical.

As has also been mentioned, the program address P register utilized in acquiring the address of the next instruction is specified by the interrupt level in control. Since an instruction word is held in two adjacent memory locations, there must be two successive references of memory in order to extract an instruction and place same into the U register for execution. $\overline{A}$ gates 7-44, 7-45 and 7-46 are conditioned to gate the content of the $I_C$ register into S1, S2, and S3 upon the occurrence of either of the commands P To S or P+1 To S as applied to $\overline{O}$7-47. $\overline{O}$7-47 is also directed to $\overline{A}$7-48 which is clocked at CP1 to set S6. The setting of S6 thereby causes the highest order octal digits of the P register address to always be equal to 01 since the binary configuration in $S_U$ is 000001. The values of the two lowest order octal digits depend upon the content of $I_C$, and further upon whether the lower or upper half of the next instruction address is to be withdrawn from memory for placement in the U register. For example, assume that the computer is operating in priority level 2 such that the two halves of the next instruction address are found in memory address locations 0104 and 0105, which act as the P register for this program. The $I_C$ register contains binary bits 010 (octal value 2). The first memory address location to be referenced is 0104 which contains the lower half of the next instruction address. A reference will then be made to 0105 which contains the upper half of the next instruction address. During the first memory reference cycle, the command P To S is generated which sets S6 and S2. This places the octal value of 0104 into the S register where it is used to extract the lower half of the next instruction address for storage into $U_L$. At the end of this cycle, the S register is cleared, and the command P+1 To S is generated during the next following memory reference cycle. This command enables $\overline{O}$7-47 to again set S6 and S2. However, command P+1 To S is also applied directly to set stage S0 in order to place an octal address of 0105 into the S register, which is 1 higher than address 0104. This memory location contains the higher half of the next instruction address which in turn is used with the previously extracted lower half to extract the next instruction itself. Thus, it will be seen that the command P To S always places an octal address of some even value into the S register depending upon the current interrupt level as specified by the content of $I_C$. A succeeding command P+1 To S places the same octal value into the S register increased by 1 due to the direct setting of S0 by the command. As another example of this, assume that interrupt level 6 is in control so that the command P To S causes the setting of S6, S3, and S2 for an octal value of 0014 (000001001100). The next following command P+1 To S also sets all of the aforementioned stages as well as stage S0, so that the lowest order octal digit 4 is increased by 1 to the value of 5.

Figure 20:
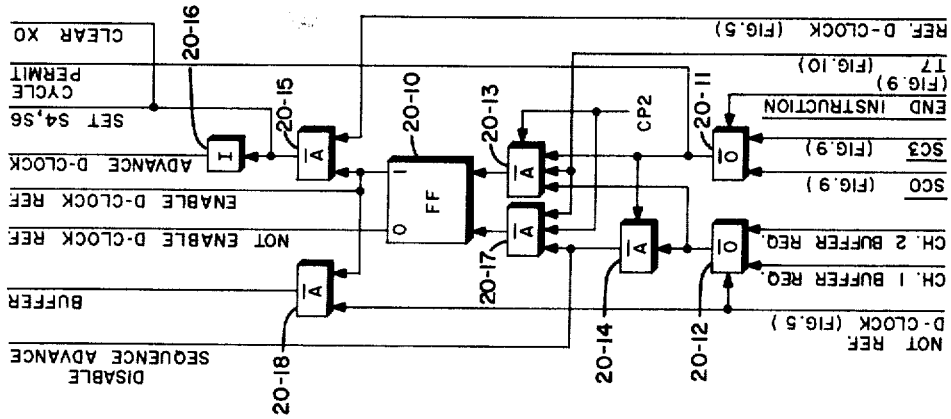
FIGURE 20 shows control circuitry used during a D-clock update or buffer transfer operation.

The S register is also cleared and then set to a particular address whenever a Delta clock register is to be updated. For any one of the four Delta clock registers, the command Set S4, S6 from FIGURE 20 is applied to set both stage S4 and S6 so that the three highest order octal digits of the address are 012. The value of the lowest order octal digit is determined by the value placed into flip-flops 5-12 and 5-11 upon the generation of the command Advance D Clock. For example, assume the configuration of these flip-flops is 00 at the time that the command Advance D Clock appears. $\overline{A}$5-17 is enabled to set FF5-11 so that the configuration changes to 01. $\overline{A}$5-17 is also applied to set S0 so that the lowest order octal digit in the S register has a value of 1. Consequently, memory address 0121 is referenced which is that belonging to Delta 1. Approximately 1 millisecond later, the command Advance D Clock is again generated to enable $\overline{A}$5-15 to set FF5-12 and so advance the count to a value of 11. In FIGURE 7, the output from $\overline{A}$5-15 is utilized to set S1 so that the lowest order octal digit has a value of 2, with the entire S register number being equal to 0122. This will address Delta 2 register in memory. When the Advance D Clock command is generated again, $\overline{A}$5–16 is enabled to clear FF5–11 so that the count is 10. In FIGURE 7, the Clear D1 signal from $\overline{A}$5–16 is employed to set both S0 and S1 in order that the lowest order octal digit of the address is equal to 3. Consequently, Delta 5 is referenced having a memory address of 0123. One millisecond later the command Advance D Clock is generated to clear FF5–12 so that the count is 00. For this condition, neither stage S0 or S1 is set, so that the lowest order octal digit in the S register has a value of 0 which thereby cause Delta $\phi$ register to be referenced, having an address 0120.

Figure 8:
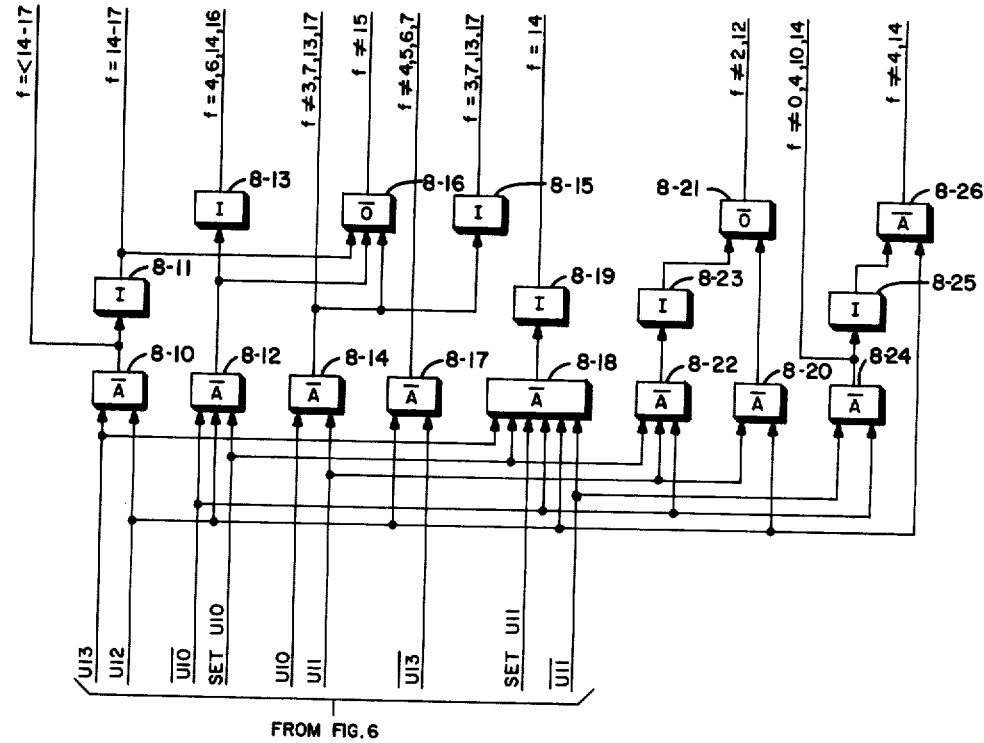
FIGURE 8 shows circuits for translating certain instruction function codes.

FIGURE 8 shows certain function translating circuits for decoding certain $f$ designator values, such as 00 (Add). Also decoded in FIGURE 8 are functions 14 and 17 which, when executed, respectively permit the setting (clearing) of the I register according to U$_L$ and clearing a particular stage of the I register upon completion of the program at that interrupt level. It is emphasized, however, that FIGURE 8 shows only a portion of the function translator. $\overline{A}$8–10 is enabled to generate a low output whenever both U13 and U12 contain binary 1's. A binary 1 in U13 indicates that the higher order octal digit of the function is 1, whereas a binary 1 in U12 indicates that the lower order octal digit of the function code is 4 or above. Consequently, the low output from $\overline{A}$8–10 when inverted by I8–11 produces a high output designated as $f=14$–17. Thus, the high output from I8–11 occurs whenever the function code in U10 through 13 has an octal value of 14, 15, 16, or 17. On the other hand, if either one or both U13 and U12 contains a binary 0, then $\overline{A}$8–10 produces a high output $f=<14$–17 indicating that the function code is less than 14.

$\overline{A}$8–12 is enabled to produce a low output for a binary 1 value in U12 and a binary 0 value in U10. The signal Set U10 from FIGURE 6 is high if stage U10 is to be left in a binary 0 condition. Consequently, the output of $\overline{A}$8–12, when inverted by I8–13, produces a high output for any one of the function codes 4, 6, 14, or 16. $\overline{A}$8–14 is enabled by a binary 1 in U11 and U10 to produce a low output indicative of the fact that the function is 3, 7, 13 or 17. I8–15 inverts this low output to generate a high output indicating this fact. However, when $\overline{A}$8–14 is positive, then this indicates that the function is not 3, 7, 13 or 17 and is so labeled. $\overline{O}$8–16 produces a high output for any low input thereto. When high, this indicates that the function code is not 15. That this is so may be observed from the fact that a low output from I8–11 indicates that the function code is less than 14. On the other hand, a low output from $\overline{A}$8–12 represents the fact that the function code is either 4, 6, 14 or 16, whereas the low output from $\overline{A}$8–14 indicates that the function code is either 3, 7, 13 or 17. Therefore, if all inputs to $\overline{O}$8–16 are high, the function must be equal to 15 and is represented by a low output from $\overline{O}$8–16. $\overline{A}$8–17 has a low output only when the function code is 4, 5, 6, or 7, since it is responsive to a binary 1 in U12 and a binary 0 in U13. Otherwise, its output is high for indicating that the function code is not either 4, 5, 6, or 7. $\overline{A}$8–18 produces a low output only when the function code is 14 which, when inverted by 8–19, is a high for this value. The purpose of applying the Set U10 and Set U11 signals from FIGURE 6 is to insure that I8–19 will not produce a high output if either one or both of the stages U10 or U11 is to be set to a binary 1 value.

The output of $\overline{A}$8–20 is low if the function code is either 6 or 16. Consequently, the output of $\overline{O}$8–21 is high for these values, which at least indicates that the function code is not 2 or 12. $\overline{A}$8–22 has a low output for either one of the function codes 2, 6, 12 or 16. If the function code is either 2 or 12, then $\overline{A}$8–22 is low which produces a high output from I8–23. $\overline{A}$8–20 is high for either one of the function codes 2 or 12, which would thus make low the output of $\overline{O}$8–21 and indicate that the function code is either 2 or 12. Consequently, the output of $\overline{O}$8–21 is high for any function code except 2 or 12.

$\overline{A}$8–24 has a low output whenever binary 0 values are in U10 and U11. Consequently, this implies that the lower order octal digit can have a value only of 0 or 4, such that the function code must be either 0, 4, 10 or 14. The output of $\overline{A}$8–24 is consequently high whenever the function code is not 0, 4, 10 or 14. 18–25 inverts a low output from $\overline{A}$8–24 and applies a high input to one terminal of $\overline{A}$8–26. If the function code is actually either 4 or 14, U12 has a binary 1 therein which applies another high input to $\overline{A}$8–26 so that its output is low, thus indicating a function to be either 4 or 14. For any function other than 4 or 14, $\overline{A}$8–26 is high. In summary therefore, it may be seen that the outputs labeled in FIGURE 8 indicate the function code or absence of a function code for the high signal.

Figure 9:
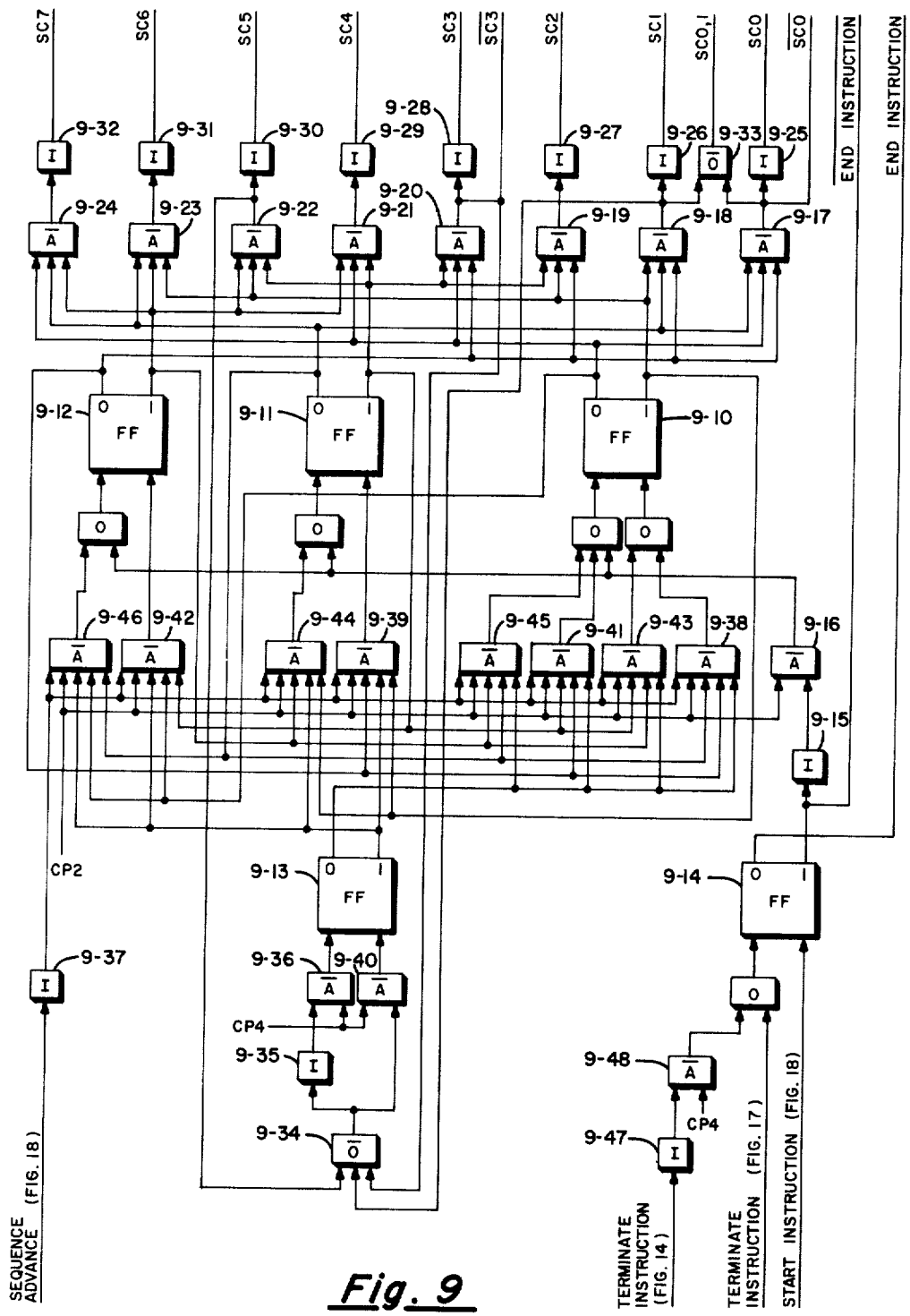
FIGURE 9 shows details of the instruction sequence counter.

The acquisition and execution of each instruction during an instruction cycle requires successive memory cycles whose number depends upon the particular function code and, at times, upon the value of the $a$ or $b$ designator. In order to cycle the acquisition and execution of an instruction correctly, an instruction sequence counter is provided. FIGURE 9 shows details of this instruction sequence counter which comprises three stages 9–10, 9–11, and 9–12 connected together to count in the well known Gray code having the following format.

| Memory Cycle | Gray Code |
|---|---|
| 0 | 000 |
| 1 | 001 |
| 2 | 011 |
| 3 | 010 |
| 4 | 110 |
| 5 | 111 |
| 6 | 101 |
| 7 | 100 |

To aid in advancing the counting states, FF9–13 is provided. A control flip-flop FF9–14 is normally clear whenever there is no instruction word to be executed. This clear condition of FF9–14 produces a low output from its 1 terminal which, when inverted by 9–15, introduces a high input to one terminal of $\overline{A}$9–16. Consequently, for this condition the occurrence of CP2 causes $\overline{A}$9–16 to clear each of the counting stages 9–10 through 9–12. The counter configuration at this time is therefore 000 in stages 9–12, 9–11, and 9–10, respectively.

$\overline{A}$9–17 through 9–24 are provided to decode the counter content in order to generate a signal indicative of the particular memory cycle in which the instruction cycle now finds itself. For example, $\overline{A}$9–17 is enabled by binary 0 values in all of the stages FF9–10 through 9–12 to produce a low output which, when inverted by I9–25, produces a high output SC0 defined as sequence count or memory cycle 0. $\overline{A}$9–18 is enabled for the counter configuration of 001 and thus produces a negative output from I9–26 indicative of sequence count 1. In like fashion, $\overline{A}$9–19 through 9–24 are responsive to counter configurations for producing the high signals SC2 through SC7 from I gates 9–27 through 9–32, respectively. As may be observed, only one of the outputs from the I gates 9–25 through 9–32 is high at any one time, depending upon the particular states of FF9–10 through 9–12. $\overline{O}$9–33 is high when the sequence count is either 0 or 1. Some signals, for example, $\overline{SC0}$ and $\overline{SC3}$, are taken directly from $\overline{A}$9–17 and $\overline{A}$9–20, respectively.

The operation of the counter in FIGURE 9 will now be described. As mentioned before, the clear state of FF9–14 causes $\overline{A}$9–16 to maintain the counter stages in their binary 0 configurations. Consequently, $\overline{A}$9–17 is enabled to generate a low output and in turn causes a high output SC0. $\overline{A}$9–18, $\overline{A}$9–20, and $\overline{A}$9–22 are all high so that $\overline{O}$9–34 has a low output therefrom. This low output is inverted via I9–35 such that $\overline{A}$9–36 is enabled at each CP4. Consequently, FF9–13 is also maintained in its clear condition.

Following the insertion of an instruction word into the U register, a command Start Instruction is applied to FF9–14 to set it. As long as FF9–14 is set, $\overline{I}$9–15 has a low output which prevents $\overline{A}$9–16 from being enabled at successive CP2 times. However, the counter maintains the configuration 000 until the command Sequence Advance is applied via I9–37 and from there simultaneously to all of the $\overline{A}$ gates connected to the inputs of the counter flip-flops. Sometime during the presence of command Sequence Advance, CP2 arrives and is also applied to all of these $\overline{A}$ gates. Only $\overline{A}$9–38 at this time has all high inputs, since flp-flops 9–11, 9–12, and 9–13 are in their clear condition. Consequently, FF9–10 is set so that the counter configuration is now 001.

After FF9–10 has been set, $\overline{A}$9–18 is enabled to produce a low output which in turn produces a high output from $\overline{O}$9–34. This high output is clocked at the next following CP4 to set FF9–13. The set condition of FF9–13 thereupon allows only $\overline{A}$9–39 to become enabled when the command Sequence Advance once again appears. Consequently, the configuration of the counter changes from 001 to 011. The output of $\overline{A}$9–19 now goes low while $\overline{A}$9–18 goes high. The output of $\overline{O}$9–34 again is low which allows $\overline{A}$9–36 to once again clear FF9–13. The next time that the command Sequence Advance is generated, $\overline{A}$9–41 is enabled to clear FF9–10, thus changing the configuration from 011 to 010. This in turn makes low the output of $\overline{A}$9–20 so that $\overline{A}$9–40 can set FF9–13. $\overline{A}$9–42 thereupon is conditioned to set FF9–12 the next time that the command Sequence Advance is generated, and the counter changes to value 110. All high inputs to $\overline{O}$9–34 now cause FF9–13 to again be cleared. This in turn allows $\overline{A}$9–43 to set FF9–10 the next time the count is to be advanced. All 1's in the counter stages make low the output of $\overline{A}$9–22 which in turn causes FF9–13 to again be set. Since both FF9–10 and 9–12 are now set, $\overline{A}$9–44 can become enabled to clear FF9–11, changing the count from 111 to 101. FF9–13 consequently becomes clear to thereupon enable $\overline{A}$9–45 to clear FF9–10. When the counter configuration is 100, $\overline{A}$9–24 has a low output which produces the high signal SC7.

It is thus seen that when FF9–14 is set and the command Sequence Advance is generated at appropriate times, the instruction sequence counter in FIGURE 9 steps through the memory cycles in order to acquire and execute the instruction word. Each instruction word, no matter what its function, requires at least four cycles SC0 through SC3. Various instruction words require additional memory cycles, whereas two functions 05 and 07 require all eight memory cycles. The clearing of FF9–14 by any one of a number of commands Terminate Instruction will thereupon interrupt the counting sequence of stages 9–10 through 9–12, and return same to their cleared 000 condition.

Figure 10:
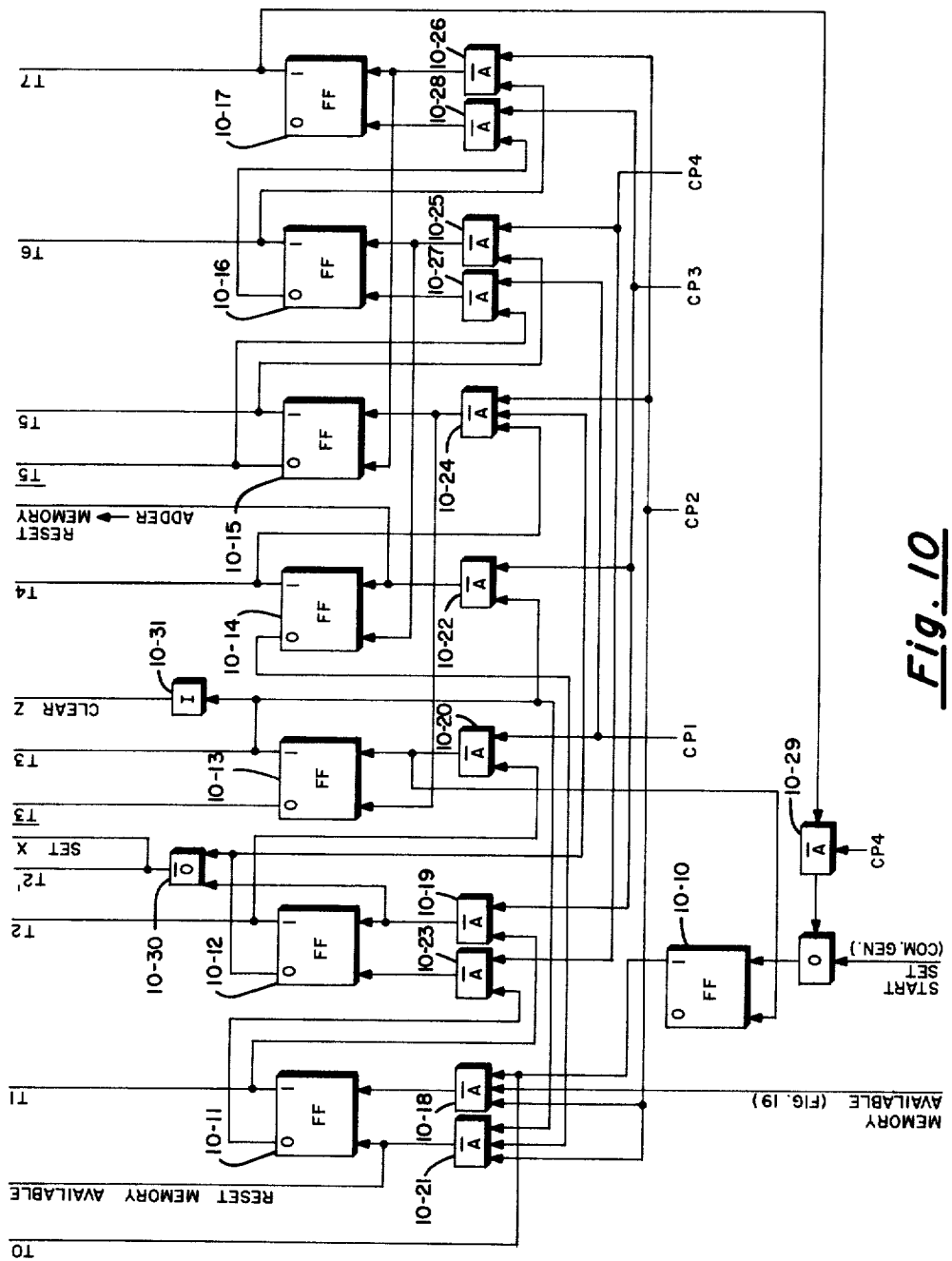
FIGURE 10 shows details of the timing chain.
Figure 12:
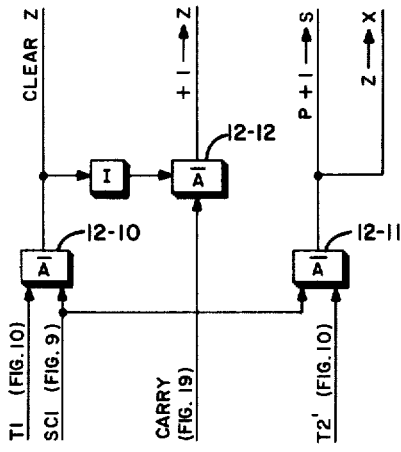
Figure 13:
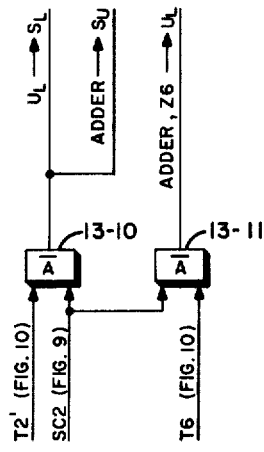
Figure 14:
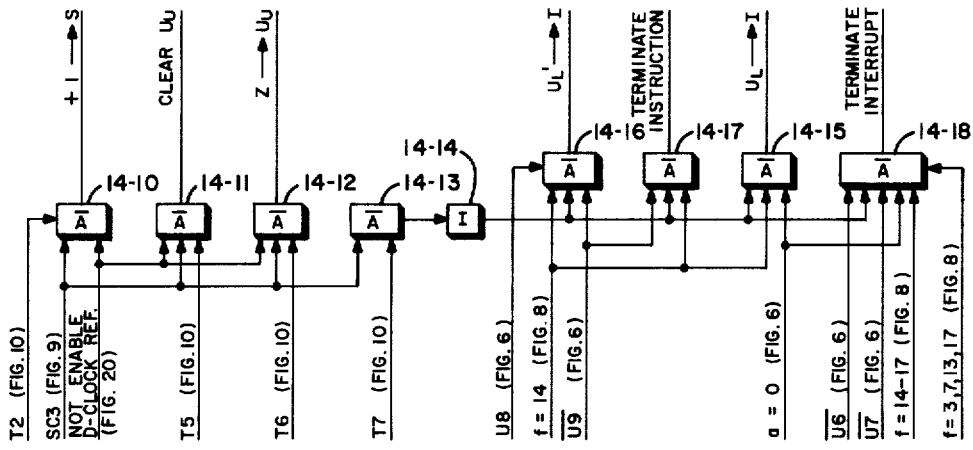
Figure 15:
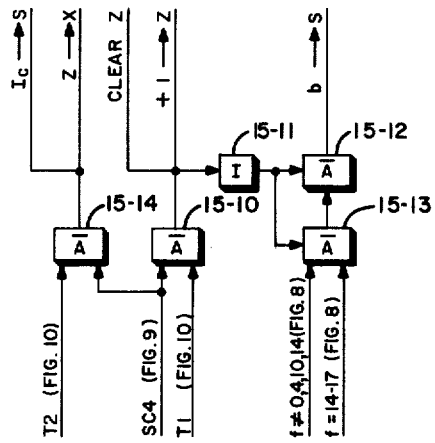
Figure 16:
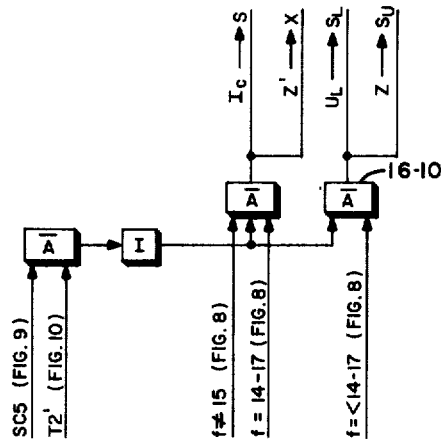
Figure 17:
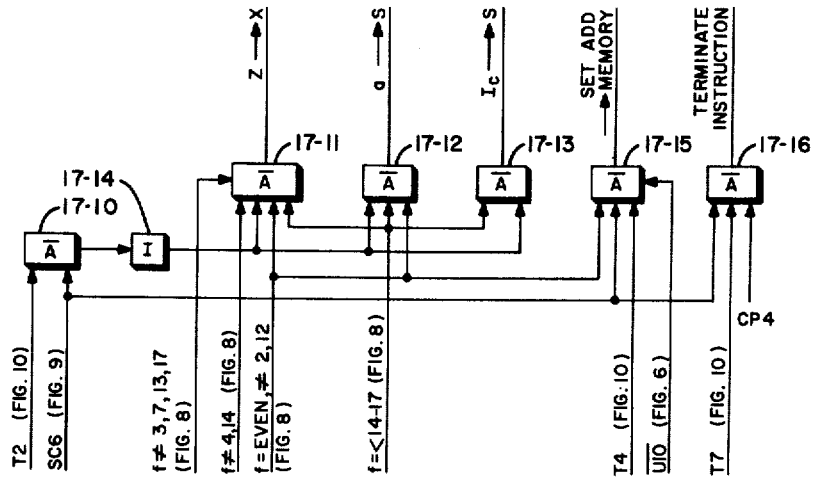

Each of the memory cycles defined by the sequence counter in FIGURE 9 is further broken down into operation times. FIGURE 10 of the drawings shows a timing chain comprised of flip-flops 10—10 through 10–17. For each of the SC cycles required during an instruction cycle, the timing chain runs through a complete cycle to actually govern the operation performed during the particular SC cycle. These times within each sequence count cycle are identified by signals T0, T1, T2, T3, T4, T5, T6 and T7. Operation of the circuit in FIGURE 10 may be better understood by referring to FIGURE 23. FIGURE 23 is a timing diagram showing how a typical instruction with Add function (00) is performed. For each of the memory cycles SC0, SC1, etc. the timing chain in FIGURE 10 operates to generate the overlapped signals T0 through T7 in the following manner. Assume first that at CP4, FF10–10 is set by some initial Start Set signal. Time T0 commences as represented by the high signal on the 1 output of FF10–10. If the signal Memory Available is present, which indicates the fact that the memory may be referenced for data, then $\overline{A}$10–18 is clocked at CP2 in order to set FF10–11 and thus generate the T1 signal. At the next following CP3, $\overline{A}$10–19 is thereupon enabled to set FF10–12 which produces T2. In FIGURE 23 it may be thus seen that times T0, T1, and T2 are generated in overlapping fashion. With FF10–12 set, $\overline{A}$10–20 is enabled in the next following CP1 to set FF10–13 (T3) as well clearing FF10–10. With FF10–13 set and FF10–14 still clear, $\overline{A}$10–21 is enabled at the next following CP2 to clear FF10–11 and thus terminate T1. One clock pulse later at CP3, $\overline{A}$10–22 sets FF10–14. $\overline{A}$10–23 further clears FF10–12 since FF10–11 is now clear. The set state of FF10–14 and the clear state of FF10–12 now enable $\overline{A}$10–24 at CP2 in order to set FF10–15. This stage produces the T5 signal. $\overline{A}$10–25 sets FF10–16 at CP4 with $\overline{A}$10–26 subsequently setting FF10–17. The negative output from $\overline{A}$10–25 also clears FF10–14, whereas the low output from $\overline{A}$10–26 clears FF10–15. When FF10–15 is clear, $\overline{A}$10–27 clears FF10–16, and then $\overline{A}$10–28 clears FF10–17. However, while FF10–17 is set, $\overline{A}$10–29 is enabled at CP4 to set FF10–10 which once again initiates the timing chain cycle.

Figure 11:
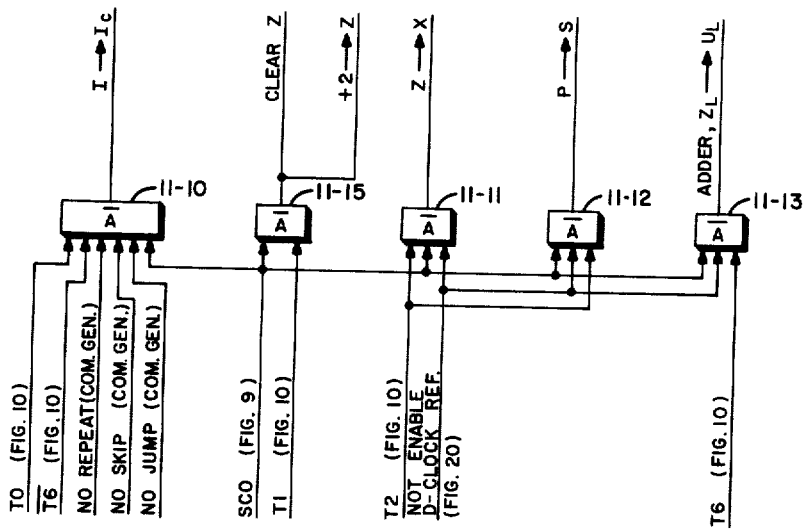
FIGURES 11 through 18 show certain of the command generating circuits.
Figure 18:
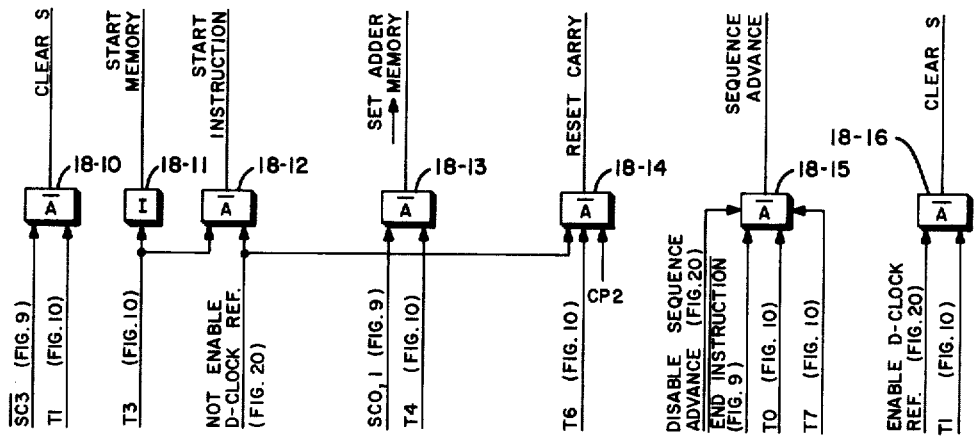

FIGURES 11 through 18 show various logical circuitry for generating the commands required in the acquisition execution of an instruction having the Add function 00. FIGURE 11, for example, shows the commands required during the first memory cycle designated by the high signal SC0 from FIGURE 9. FIGURES 12, 13, 14, 15, 16 and 17 likewise show the commands required in order to accomplish the operations during memory cycles SC1, SC2, SC3, SC4, SC5, SC6, respectively. FIGURE 18 shows command generating circuits which are not peculiar to any one specific memory cycle. The detailed operation of the circuits in these figures wll be explained subsequently during the description of the execution of a typical instruction.

Figure 19B:
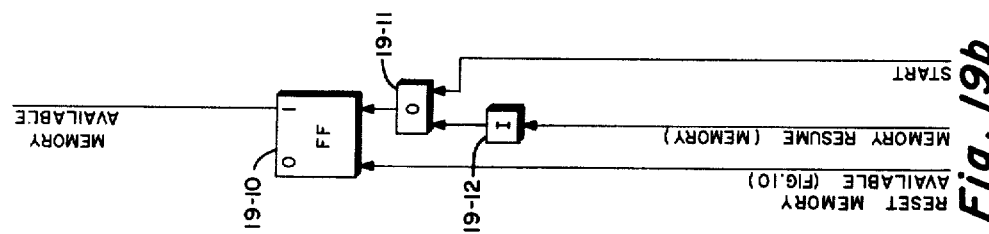
FIGURES 19a and 19b show miscellaneous circuits for controlling a memory access operation.
Figure 19A:
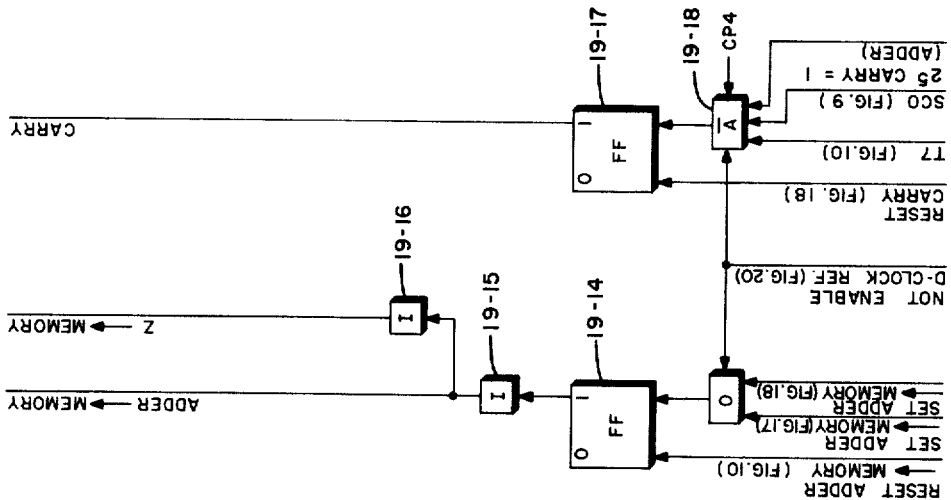

FIGURES 19a, 19b, and 20 show control crcuitry for performing various miscellaneous functions. In FIGURE 19a, FF19–14 determines the source of information which is read into memory during Restore time, which is that time following the Read time. When FF19–14 is clear, I19–15 has a high output which in turn makes low the output of I19–16. For this condition, information written into memory comes from the Z register. If FF19–14 is set by the appropriate signal, then the command Adder To M becomes low and gates the contents of the adder into the memory.

FF19–10 operates to generate the signal Memory Available which is required in FIGURE 10 to initiate time T1. A high signal Memory Resume is applied to I19–12 whenever the memory indicates that it can be referenced for information. I19–12 in turn sets FF19–10, thus generating the high signal Memory Available. The memory cycle commences and the memory is addressed for information. The signal Reset Memory Available is then applied from FIGURE 10 and clears FF19–10, which thereafter awaits another high signal Memory Resume indicating that memory may again be referenced.

Flip-flop 19–17 is provided to store a carry of 1 from bit order $2^5$ which may result from the addition of the contents of the Z and X registers during SC0. It is used in order to update the address of the next instruction carried by the P register for the current interrupt level. During the first memory cycle of the execution of an instruction (SC0), a value of 2 is added to the lower half of the next instruction address. If any carry of 1 results from adder bit order $2^5$, $\overline{A}$19–18 samples same and sets FF19–17. During the next following memory cycle (SC1), a carryover of 1 may now be added to adder bit order $2^9$ and consequently, to the higher half of the next instruction address.

FIGURE 20 shows the control circuitry required for either a Delta clock update operation or for the buffer data transfer operation on the input/output channels. During buffered input/output, one memory reference is made for each data word to be transferred. The buffer can interrupt a program in the middle of an instruction cycle to make the memory reference. However, the interruption of an instruction cycle can only be performed at the end of SC0 or SC3. If there is no instruction cycle being performed, then the memory reference for buffer operation can be made at any time. The same limitations apply for a Delta clock update in that the memory reference to obtain a clock register can only occur during an instruction cycle at the end of SC0 or SC3, or at any time when no instruction cycle is being performed. In FIGURE 20, $\overline{O}$20–11 is responsive to any one of the low signals $\overline{SC0}$, $\overline{SC3}$, or $\overline{End\ Instruction}$ in order to generate a high output therefrom. This output is applied to $\overline{A}$20–14, 20–13, and is also directed to FIGURE 5 as the command Cycle Permit. $\overline{O}$20–12 generates a high output if there is a buffer request for either Channel 1 or Channel 2, or if a low signal Not Reference D-Clock appears from FIGURE 5 which signifies the set condition of FF5–27. The signals Channel 1 Buffer Request and Channel 2 Buffer Request are generated by circuitry not shown, but appear whenever the indicated channel can accept another data word transfer during buffer operation.

FF20–10 is set by $\overline{A}$20–13 at CP2 only for high outputs from both $\overline{O}$20–11 and $\overline{O}$20–12, and only during the time T7 which occurs at the end of SC0, SC3, or in between instruction cycles. When set, FF20–10 produces the high command Enable D-Clock Reference. $\overline{A}$20–15 is enabled during the set condition of both FF20–10 and FF5–27 in order to produce the commands Clear X0 and Set S4, S6 which are required for a D-clock updating operation. Furthermore, I20–16 inverts the low output from $\overline{A}$20–15 to thereby produce the command Advance D-Clock which is used in FIGURE 5 in the manner before described. On the other hand, if FF20–10 is set because of a buffer request on either one of the input/output channels, then the command Not Reference D-Clock is high to enable $\overline{A}$20–18 to produce the command Buffer which is utilized in FIGURE 3 to indicate that a buffered data transfer is being performed. If the word being transferred at this time is the last one of the group to be directed between the external unit and the internal computer memory, then the $R_k$ counter is decremented by 1 to equal 0, which thereupon enables either $\overline{A}$3–52 or $\overline{A}$3–53 according to the particular input-output channel on which the buffered transfer is being made.

$\overline{A}$20–14 is enabled for high outputs from both $\overline{O}$20–12 and $\overline{O}$20–11. A low signal therefrom is labeled Disable Sequence Advance which prevents the stepping of the sequence counter in FIGURE 9. Consequently, if a buffer or a Delta clock update is requested during an instruction cycle, the sequence counter is prevented for one memory cycle from stepping from SC0 to SC1, or from SC3 to SC4, whichever may be the case. During this inhibiting memory cycle, the memory is instead referenced for a Delta clock register content, or for a location which involves the data word being transferred on the I/O channel. $\overline{A}$20–14 also helps clear FF20–10 via $\overline{A}$20–17 one memory cycle after said FF has been initially set by $\overline{A}$20–13. By this time, $\overline{O}$20–12 generates a low output which will make the output of $\overline{A}$20–14 high in order to aid in enabling $\overline{A}$20–17.

FIGURE 21 shows part of the Z register which acts as a buffer between the memory and other registers external to said memory. This register contains seven bits, only three of which are shown in FIGURE 21 for the sake of simplicity. Any one of the commands Clear Z applied to $\overline{A}$21–10 and clocked at CP4 will set all of the Z register stages to a 0 value. When reading from memory, each stage is responsive to a low signal from an associated memory sense amplifier in order to set the stage to a binary 1 value if this value bit is read out. Two $\overline{A}$ gates 21–11 and 21–12 are also provided to force a particular value into Z register. $\overline{A}$21–11 is enabled at CP1 by the command +2 To Z in order to set Z1. If all other Z stages are cleared, the value in the Z register is 0000010, which is octal value 2. $\overline{A}$21–12 can be enabled by a command +1 To Z in order to set stage Z0 and effectively place the octal value 1 into the Z register. Inputs to the Z register from the I/O channels 1 and 2 are not shown in FIGURE 21, although these are actually provided as may be seen from FIGURE 1.

FIGURE 22 shows two stages in the seven-bit X register. This register receives an operand from the Z register. Prior to receipt of information from the Z register, the command Set X is applied to $\overline{A}$22–10 which is enabled at CP2 in order to set all of the X stages to a binary 1 value. This then places the octal value of −0 into the X register. When it is necessary to transfer information from the Z register into the X register, $\overline{A}$ gates 22–11 through 22–17 are conditioned at CP3 by any one of the commands Z To X in order to transfer zero bit values from Z. For example, stage X0 is initially set to 1, but if Z0 contains a binary 0 value, then the enabling of $\overline{A}$22–11 clears X0. On the other hand, if stage Z0 contains a binary 1, then $\overline{A}$22–11 cannot produce a low output, thus maintaining stage X0 in its binary 1 condition. $\overline{A}$ gates 22–19 through 22–25 are provided to transfer the complement of the Z register bits into the X register when the command Z To X is generated. (If Z0 is set to 1, then $\overline{A}$22–19 clears X0 to a 0 value.) For a D-clock update operation, the generation of the low command Clear X0 from FIGURE 20 will cause the X register configuration to become 1111110, which is value −01 in octal. This value, when added to the content of the referenced Delta register, decrements said content by 1.

OPERATION

In order to illustrate the operation of the present invention, i.e., the provision of a different set of operational A, B, and P registers for each interrupt priority level, the execution of a typical instruction such as Add ($f$=00) will now be described. The following assumptions are made for purposes of this discussion. First, the Add instruction is found in the program controlled by interrupt level 6. Second, its address in memory occupies locations 2500 and 2501 (octal). Third, its $a$ designator is 01 and its $b$ designator is 10. Fourth, its $y$ zone contains 32 (octal). The number of memory cycles required to acquire and execute this instruction together with the operation during each are given below, where NI designates Next Instruction.

Memory cycle                                      Operation
    SC0 ____ Acquire NI address (lower half).
    SC1 ____ Acquire NI address (upper half).
    SC2 ____ Acquire NI (lower half).
    SC3 ____ Acquire NI (upper half).
    SC4 ____ Acquire B register content.
    SC5 ____ Acquire operand from Y$b$.
    SC6 ____ Acquire, alter, restore A register content.

Figure 23A:
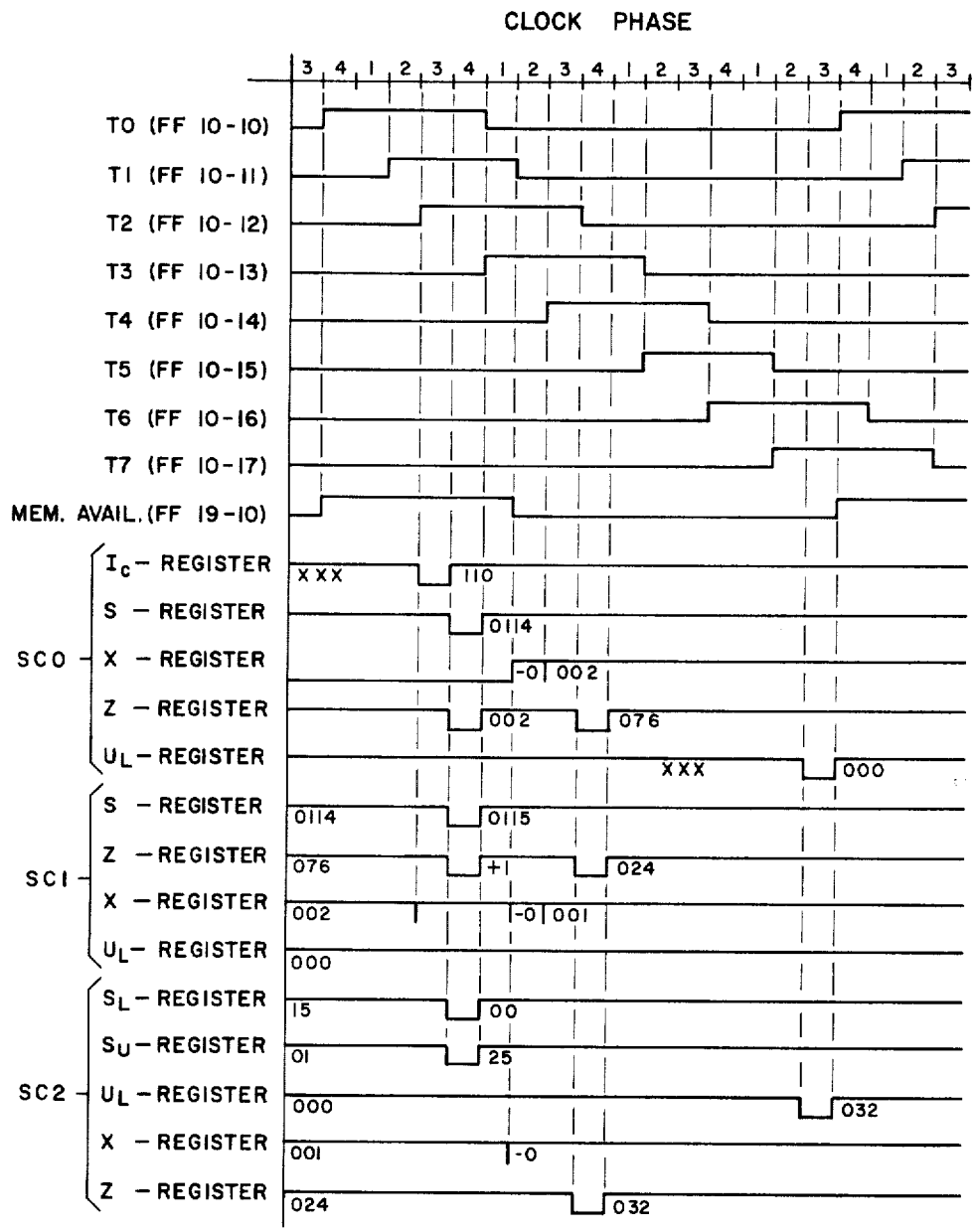
FIGURES 23a and 23b show a timing diagram illustrating the execution of a typical instruction.

Referring now to FIGURES 23$a$ and 23$b$, the detail operation during each of the sequence count cycles 0 through 6 is shown. For the Add instruction, sequence count 7 is not required, and the instruction cycle is terminated at the end of SC6. The content of the various registers during each SC cycle is indicated by a legend enclosed by a square wave. Where a register waveform in any particular time is low, this indicates that the register is empty. The diagram showing the T0 through T7 times at the top of FIGURE 23a is applicable for each of the SC cycles.

Assume that the instruction sequence counter in FIGURE 9 has all of its stages clear so that the high signal SC0 is generated. When FF10–10 is set, the signal T0 enables $\overline{A}$11–10 to first clear $I_C$ at CP3 and then transfer the highest priority level in I register to $I_C$ at CP4. Under the assumption that the highest priority stage set at this time is I6, $I_C$ register has a configuration of 110 at the conclusion of T0 time. During T1, $\overline{A}$11–15 causes Z register to first be cleared at CP4, and then forces a +2 octal value into Z at the next following CP1. Also at T1 $\overline{A}$18–10 clears S register at CP4 of its previous contents. During T2, $\overline{A}$11–12 causes the octal value 0114 to be placed into S register at CP1. This is the memory address of the program address register P for interrupt level 6 which contains the lower half of the next instruction address. Also during T2, $\overline{O}$10–30 causes the X register to be set to all 1's at CP2, whereupon $\overline{A}$11–11 transfers the +2 value in Z register into X register at the next following CP3.

During T3 of the SC0 cycle, I18–11 produces a signal which starts the memory read-restore operation, and $\overline{A}$18–12 sets FF9–14 so that the instruction sequence counter is advanced at appropriate times. I10–31 also clears the Z register at CP4 so that it receives the lower half of the next instruction address as it is read from memory location 0114. This lower half of the next instruction address has an octal value of 076 and is placed into Z register from the memory sense amplifiers. It should here be mentioned that the value 0 is always contained in position 6 of the P register memory locations.

When FF10–14 is set to thereby commence time T4, $\overline{A}$10–22 clears FF19–14. This is done automatically each time that T4 is initiated. However, as soon as the high T4 signal appears, $\overline{A}$18–13 sets FF19–14 once more so that the the information restored back into memory comes from the output of the adder. At the time that restoring in memory occurs, the adder is responsive to the octal digits 076 in Z register and the octal digits 002 in X register to thereby produce the sum digits of 000 (octal) which comprise the lower half of the address of the Add instruction to be acquired and executed. Normally, 076+002=100. However, during SC0 the adder output $2^6$ is inhibited to insure that the lower half of the address remains positive. During T6, $\overline{A}$11–13 is enabled to first clear $U_L$ at CP3, and then transfer the output of the adder positions $2^0$–$2^5$ (as well as the 0 bit in Z6) into $U_L$ at CP4. Consequently, at the end of cycle SC0, stages 0 through 5 of $U_L$ contain the octal digits 00, while stage 6 of $U_L$ also holds a binary 0. $\overline{A}$18–14 further causes Carry flip-flop FF19–17 to be reset at CP2 during time T6.

During T7, $\overline{A}$11–14 is conditioned to sense whether or not the addition of the numbers in the Z and X registers results in a carry-over of 1 from bit position $2^5$. If so, then $\overline{A}$19–18 is enabled at CP4 to set FF19–17 so that this carry-over may be added to bit position $2^0$ of the higher half of the next instruction address which is acquired during the next following cycle SC1. When time T0 once again commences and is overlapped with time T7, $\overline{A}$13–15 is enabled to advance the sequence counter of FIGURE 9 so that the signal SC1 becomes high. SC0 thereupon becomes low, thus ending the first memory cycle of this instruction cycle.

During SC1, as indicated by FIGURE 23a, $\overline{A}$12–10 clears the Z register of its octal value 076 at CP4 so that at the next following CP1, $\overline{A}$12–12 places the octal value of 001 into said register, which means that Z0 is set while Z1 through Z6 remain clear. This only occurs, however, if the Carry flip-flop 19–17 had been set during SC0. In the example under consideration, this is the case since the octal value of 02 added to the octal values 76 results in a carry-over of 1 from the second lowest octal order (from bit position $2^5$ of the adder). Also during T1 of SC1, $\overline{A}$18–10 clears the S register of the memory address 0114 to make way for the insertion of the P register address 0115 which holds the higher half of the next instruction address for interrupt level 6. Consequently, at T2 time, $\overline{A}$12–11 is enabled to generate the command P+1 To S which places the address 0115 into S register. Furthermore, at this time $\overline{O}$10–30 sets the X register to all 1's at CP2. At the next following CP3, $\overline{A}$12–11 also causes the transfer of the +1 value in Z register to the X register. During T3, I18–11 again initiates memory operation while I10–31 clears Z register of said previously inserted +1 value in order to prepare it for the entry of the higher half of the next instruction address from memory location 0115. This higher half has the octal value of 24.

The initiation of T4 by $\overline{A}$10–22 also resets flip-flop 19–14. However, $\overline{A}$18–13 is enabled to subsequently set FF19–14 so that the output of the adder is once again read into memory during SC1. Since the adder is responsive to the value 24 in Z register and the value 01 in X register, its output is the sum 25. This adder output is maintained as long as Z register holds value 24 and the X register holds value 01, with the sum digits 25 being written back into memory address 0115 in the restore portion of the SC1 memory cycle. At time T6, $\overline{A}$18–14 resets FF19–17 at CP2, while at time T7, $\overline{A}$18–15 is enabled during the overlap of T0 and CP2 in order to advance the sequence counter to SC2.

At T1 of SC2, $\overline{A}$18–10 clears the S register of its previous contents (0115). When time T2 is initiated, $\overline{A}$13–10 is enabled to transfer the content of $U_L$ into $S_L$, and the adder output into $S_U$, both at CP1. Thus, $S_L$ now contains the octal value of 00 while $S_U$ contains the octal value 25. The address held in the S register considered in its entirety is 2500 which is that memory location holding the lower half of the Add instruction being considered in this example. Furthermore, it should be appreciated that the P address locations 0115 and 0114 in memory, from which the value 2476 was taken, also now contain the value 2500 (considering only positions 0 through 5 of each location, since position 6 contains binary 0).

During T3, I18–11 starts the memory read-write operation and I10–31 clears Z register in preparation for entry of the lower half of the Add instruction. This lower half holds the y designator of the instruction as well as the lower order bit of the b designator. For purposes of this discussion it has been assumed that the y designator portion has an octal value of 32, whereas the b designator lower order bit is 0. Consequently, it is seen from FIGURE 23 that the value 032 is entered into Z register from memory address location 2500. At T6, $\overline{A}$13–11 clears $U_L$ at CP3 and then transfers the output of the adder into $U_L$ along with the value in Z6. Since the adder at this time is responsive to the value 032 in Z register and the value —0 in X register, the number placed into $U_L$ is 032. During the overlap of time T7 and T0, $\overline{A}$18–15 advances the sequence counter to commence cycle SC3.

During SC3, the following events occur. At T2, $\overline{A}$14–10 sets S0 to binary 1, thus incrementing the address in S register from 2500 to 2501. This latter address contains the higher half of the instruction to be acquired, which is that half containing the function code 00, the a designator 01, and the higher order bit 1 of the b designator. During T3, I18–11 starts memory and I10–31 clears Z register of its previous contents (032). Consequently, Z register is ready for the entry of the higher half of the instruction from location 2501. At T5, $\overline{A}14$–$11$ clears $U_U$ register so that at T6, $\overline{A}14$–$12$ transfers Z register into $U_U$ at CP2. Hence, at the conclusion of SC3, $U_U$ holds the octal value of 003, while $U_L$ holds the octal value of 032. Looking at the U register in its entirety, therefore, the complete instruction word has a function code of 0000, an $a$ designator of 01, a $b$ designator of 10, and a $y$ designator of 011010. $\overline{A}18$–$15$ is enabled at T7 and T0 to advance the sequence counter and initiate memory cycle SC4.

During SC4, the B register content is obtained from memory according to both the value of the $b$ designator and the interrupt level program to which the instruction belongs. At T1, $\overline{A}18$–$10$ clears S register at CP4, while $\overline{A}15$–$10$ clears Z register also at CP4. At CP1, $\overline{A}15$–$12$ transfers the $b$ designator 10 into S register at CP1. $\overline{A}15$–$14$ also transfers the $I_C$ register to S at CP1 in order to set stages S5 and S4 in accordance with the interrupt level of 6. Thus, $S_U$ register contains all zero values, whereas $S_L$ register contains 110110 in accordance with the $b$ designator value of 2 and a current interrupt level of 6.

The initiation of time T2 causes $\overline{O}10$–$30$ to set X register to all ones. During T3, I18–11 starts the memory read-write operation and I10–31 clears Z register in preparation for receipt of the content of the B register whose address is 0066. For the purpose of this description, it is assumed that the B register content is a binary bit value of 0110000 so that Z register is set to this configuration during the latter part of SC4. During the overlap of T7 and T0, $\overline{A}18$–$15$ now advances the sequence counter at CP2 in order that memory cycle SC5 may be entered.

During SC5, an operand will be obtained from the memory location whose address is comprised of both the $y$ designator of the instruction word as well as the content of the B register acquired during SC4. During T1, $\overline{A}18$–$10$ clears S register of the B register address. At time T2, $\overline{A}16$–$10$ transfers $U_L$ into $S_L$ and Z register into $S_U$, both at CP1. $S_L$ now contains the octal digits 32, while $S_U$ contains the octal digits 60. The memory is therefore referenced at location 6032 which holds an operand to be added to the content of an A register during SC6. During SC5 and T3 time, I18–11 starts the memory read-write operation and I10–31 clears Z register for entry of this operand. Consequently, Z register at the end of the SC5 holds the operand from memory location 6032, and $\overline{A}18$–$15$ is enabled to once again advance the sequence counter to commence memory cycle SC6.

During SC6, the $a$ designator and current interrupt level 6 determine which A register in memory is to be selected. Its content is added to the operand which was extracted during SC5, and the sum placed back into the A register. During T1, $\overline{A}18$–$10$ clears S register at CP4. During T2, $\overline{A}17$–$11$ transfers the operand in Z register into X register. $\overline{A}17$–$12$ sets stage S0 to the $a$ designator value 01, while $\overline{A}17$–$13$ transfers the contents of the $I_C$ register into stages S3, S4 and S5. Consequently, the value placed into $S_L$ is 110001, while the $S_U$ register remains clear. The A register address referenced during SC6 is therefore 0061. During T3, I18–11 starts the memory read-write operation to extract the A register content and place same into Z register, which is cleared for such entry by the operation of I10–31. During T4 of SC6, $\overline{A}17$–$15$ sets FF19–14 so that the sum of Z and X from the adder output may be written back into the A register during the restore portion of the memory operation. During T7, $\overline{A}17$–$16$ is enabled to generate the command Terminate Instruction which clears FF9–14 and thus prevents the sequence counter from stepping to memory cycle SC7. This last memory cycle is not necessary for the execution of the Add instruction.

Figure 23B:
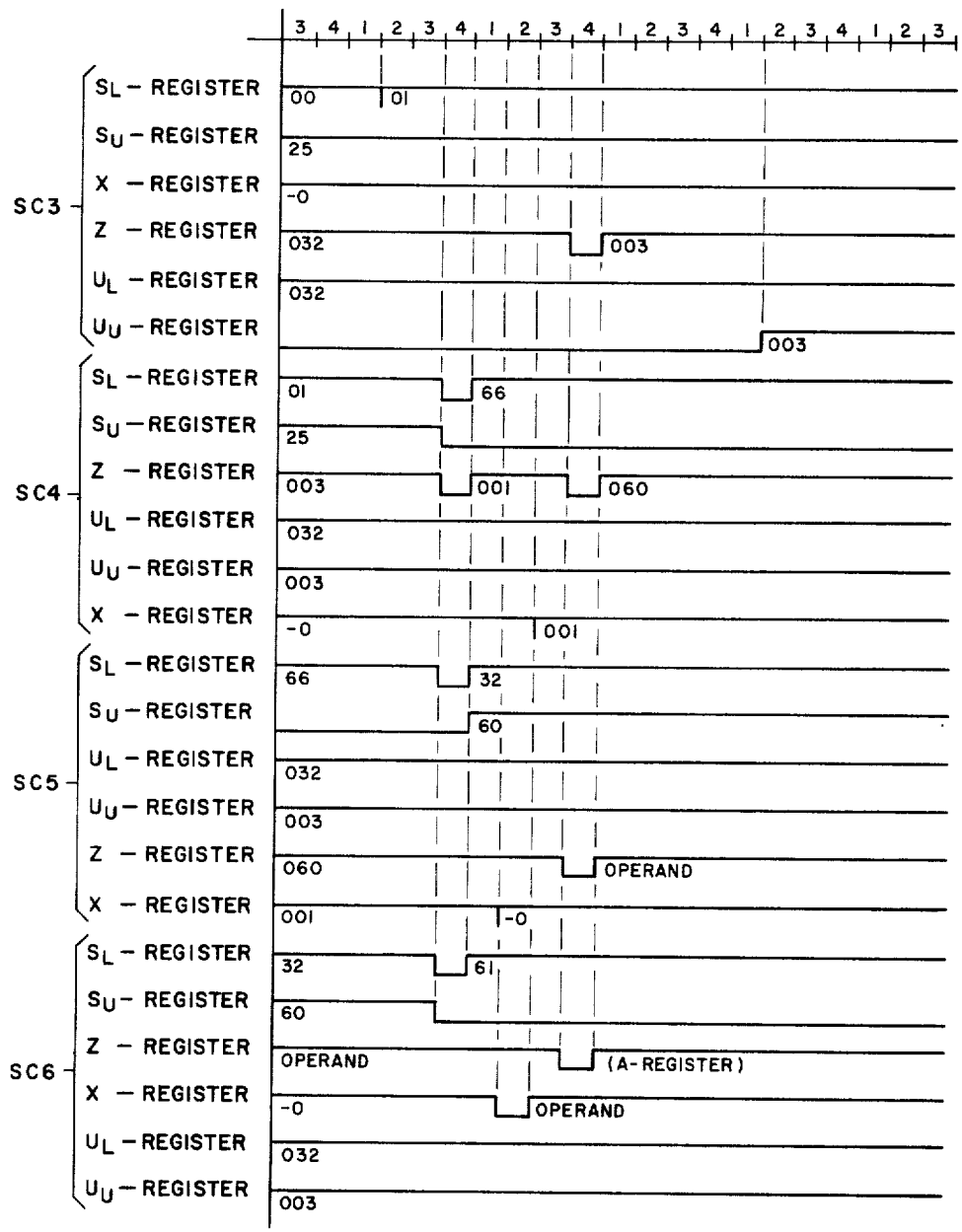

FIGURES 23a and 23b thus illustrate how the interrupt level having control of the program operates to help select the operational registers A, B, and P. The execution of instructions with different function codes might cause the reference of the A and B registers at different times from those illustrated in the example, but the function of the I and $I_C$ registers in biasing the S register remains identical no matter when said memory referencing is performed.

During the execution of an instruction with function code 14 and $a$=0, the individual bits of the I register are set to 1 if corresponding bits in the $y$ designator are 1, and if the lower order $b$ bit=1. This setting is performed during SC3 with $\overline{A}14$–$15$ generating the command $U_L$ To I at T7 time of that cycle. As mentioned in connection with FIGURE 3, this command is applied to $\overline{A}$ gates 3–36 through 3–42 to sample the content of U stages 6 through 0, respectively. These gates set I stages to 1's in accordance with 1's in these U stages. When $a$=1 with a function code 14, the I register has stored in it the bit-by-bit product of the initial content of the I register and the value contained in in U register stages 0 through 6. In other words, if U2 has a binary 0, then I2 is cleared to binary 0. In this connection, it may also be noted that a return jump operation may be programmed, by having a lower priority program include such an instruction to set a higher priority bit of I. When this is done, then program control immediately shifts to the higher level and executes the subroutine specified there. The completion of this higher priority program clears this I stage, whereupon the interrupted lower priority program resumes from the point at which the "pseudo-interrupt" or return jump occurred.

If U2 has a binary 1, and I2 has a binary 0, then I2 remains clear. For this function, $\overline{A}14$–$16$ is responsive to $f$=14 and to a cleared U9 stage and a set U8 stage for generating the command $U'_L$ To I which, in FIGURE 3, is employed to condition $\overline{A}$ gates 3–44 through 3–50. Furthermore, for any function code 14 when $a$ is equal to either 0 or 1, the instruction cycle is terminated at the end of SC3 by the enabling of $\overline{A}14$–$17$. This command Terminate Instruction is sent to FIGURE 9 to thereby clear FF9–14 which in turn prevents the stepping of the instruction sequence counter to SC4.

As mentioned before, the program for each level of interrupt is concluded by a Jump instruction (function code 17) having $a$=0 and $b$=0. This instruction, when executed, causes the currently used highest priority interrupt register stage to be cleared so that a lower priority program may take control. The command Terminate Interrupt (used in FIGURES 3a and 3b to clear the currently used I stage) is generated from $\overline{A}14$–$18$ in FIGURE 14 during cycle SC3 of a Jump instruction execution. This $\overline{A}$ gate is responsive to the signal $a$=0, as well as to zero bits in U7 and U6 which together represent the fact that the $b$ designator is also 0.

As mentioned previously, the highest set stage of the I register is normally encoded in the $I_C$ register at the beginning of each new instruction cycle during SC0. This feature permits any higher priority interrupting event to immediately take control at the conclusion of the current instruction cycle during which it occurred. However, if the instruction executed in the current instruction cycle is one specifying that a skip, repeat, or jump is to take place, then $\overline{A}11$–$10$ is inhibited from generating the command I To $I_C$ at the next following instruction cycle. Consequently, a change in programs will be delayed until the instruction following the skip, repeat, or jump instruction has been executed. If that instruction also specifies a skip, repeat, or jump, then the instruction following it will be executed before a change in programs occurs (etc.). Consequently, this particular system cannot be programmed to wait for a higher priority interrupt event by executing a jump instruction which continuously jumps to itself. This is so, since the instruction following the jump, in this case, will always be another jump so that the interrupt change of programs (I To $I_C$) is continuously locked out. A wait, however, can be programmed in two or more instructions by having the jump instruction jump to an instruction address $P_1-2$, where the instruction held there is not one specifying a jump, skip, or repeat function.

FIGURE 24 illustrates the operation performed whenever a Delta clock register is to be updated. Assume that during SC0 in FIGURE 23, the D-clock control of FIGURE 5 indicates that Delta 1 must be decremented by 1. FIGURE 24 commences during this SC0 at time T4, where it will be seen from FIGURE 23 that the S register already contains the P register address 0114, the X register contains the octal value 02, and the Z register contains the octal value 76 (which is the lower half of the next instruction address which has been extracted from P register during this cycle). Assume that at the CP3 time indicated, the oscillator 5–10 in FIGURE 5 changes to generate a low output after having been producing a high output previous to this time. While the D-clock oscillator 5–10 was producing this previous high output, FF5–13 was cleared by $\overline{A}5$–20 because both FF5–11 and FF5–12 were clear. Furthermore, FF5–23 is also set during the high output of the oscillator. Consequently, when the oscillator output goes low, $\overline{A}5$–26 is enabled to set FF5–24 at the next CP3 following the change in the oscillator output. Therefore, a high signal is applied to one input of $\overline{A}5$–30. Since it is here assumed that SC0 is generated in the sequence counter, $\overline{O}20$–11 also produces a high output labeled Cycle Permit which is applied to another input of $\overline{A}5$–30. Consequently, when time T7 of SC0 arrives, $\overline{A}5$–30 is enabled at CP1 to set FF5–27 and thus produce the command Reference D-Clock. Since the command Not Reference D-Clock goes low, $\overline{O}20$–12 now produces a high output which enables $\overline{A}20$–13 at the next following CP2. Consequently, FF20–10 is set. FF5–23 and FF5–24 are cleared, in this sequence, by circuitry previously described in connection with FIGURE 5. $\overline{A}20$–15 is responsive to the Set conditions of both FF20–10 and FF5–24 in order to produce the command Advance D-Clock from I20–16. This command is applied to FIGURE 5 to set FF5–11 and so change the counter configuration from 00 to 01.

The high outputs from $\overline{O}20$–12 and 20–11 are also applied to $\overline{A}20$–14 to generate the low command Disable Sequence Advance. This command is applied to $\overline{A}18$–15 to maintain its output positive even during the overlap of T0 and T7 at the end of cycle SC0. Consequently, the sequence counter does not step from SC0 to SC1, but instead remains at its SC0 indication. The timing chain continues to recycle and steps from T0 to T1 as shown in FIGURE 24. During T1, $\overline{A}18$–16 is now responsive to the set condition of FF20–10 in order to clear S register of its previous value. During SC0, $\overline{A}18$–10 also produces the Clear S command at the same time as does $\overline{A}18$–16. $\overline{A}18$–16 is provided in case the Delta clock updating occurs during SC3 since $\overline{A}18$–10 is normally inhibited. S register is cleared at CP4 via $\overline{A}7$–43. However, as soon as CP4 disappears, S register is set to the octal value of 0121. This is so, because the output from $\overline{A}20$–15 sets stages S4 and S6, whereas the output from $\overline{A}5$–17 sets S0. At T2, X is set to all 1's except for X0, which is cleared by the command Clear X0 from $\overline{A}20$–15. X register now contains the octal value —01. At T3, I18–11 starts the memory read-write operation so that the content of address 0121 is extracted and placed into the Z register. The contents of Z and X are added together and the result placed back into the memory location 0121 during restore.

If the adder result at this time is equal to 0, $\overline{A}5$–29 is responsive thereto during T7 time of this extended SC0 cycle. Consequently, the command Set Interrupt is applied to FIGURE 3 where it enables $\overline{A}3$–17 to set I1. $\overline{A}3$–17 at this time has high signals D1 and $\overline{D}2$. Also at T7, $\overline{A}5$–31 is enabled to clear FF5–27 at CP1. The output of $\overline{A}20$–12 now goes low to thereby enable $\overline{A}20$–14 to go high. $\overline{A}20$–17 is consequently enabled at the next following CP2 to clear FF20–10. Furthermore, the output of $\overline{A}20$–14 goes high in time to enable the output of $\overline{A}18$–15 to go low and so step the sequence counter of FIGURE 9 at CP2. Consequently, SC1 is entered, and the interrupted instruction cycle continues.

A preferred embodiment of the present invention has been shown and described in connection with a data processing system wherein the operational registers are addressable locations in the internal memory. However, it is to be understood that in some environments, some or all of the operational registers might be external to the memory in the manner of Z, X, etc. Furthermore, it may not be necessary to provide more than one accumulator or extended address register for each stored program. Other system considerations might require only the program address means to be duplicated for each program which would, in itself, save substantial operating time. The same might be said for the accumulator or index modifying registers. Therefore, many modifications will be apparent to those skilled in the art without departing from the spirit of the invention as defined in the appended claims.

What is claimed is:

1. In a data processing system controlled in accordance with instructions acquired and executed one at a time during instruction cycles, the combination comprising:
   (a) means adapted to store at addressable locations thereof a plurality of programs, each program comprised of a group of instructions having specific addresses;
   (b) a plurality of program address means, a different one associated with each of said stored programs, each program address means being selectable to thereby sequentially supply the addresses of all instructions of its associated program one at a time during successive instruction cycles; and
   (c) means to select at an instruction cycle any one of said program address means for supplying the address of an instruction to be acquired during said last named instruction cycle.

2. The invention as defined in claim 1 wherein each said program address means includes an instruction address holding register individual thereto, which register is provided by at least one particular addressable location in said storage means, with said selecting means operating during said last named instruction cycle to address said storage means for the content of one of said registers.

3. The invention as defined in claim 1 wherein said selecting means has plural input lines thereto which are adapted to receive any of a plurality of interrupt event signals randomly occurring one on each said input line, each signal specifying upon occurrence a particular one of said stored programs and all signals having a priority relationship among themselves as determined by the input lines on which they occur, with said selecting means being conditioned to select a program address means at said last named instruction cycle according to the interrupt event signal having the highest priority that was received by said selecting means prior to commencement of said last named instruction cycle.

4. The invention as defined in claim 3 wherein each said program address means includes an instruction address holding register individual thereto, which register is provided by at least one particular addressable location in said storage means, with said selecting means operating during said last named instruction cycle to address said storage means for the content of one of said registers.

5. In a data processing system controlled in accordance with instructions acquired and executed one at a time during instruction cycles, the combination comprising:
  (a) means adapted to store at addressable locations thereof a plurality of programs, each program comprised of a group of instructions having specific addresses;
  (b) a plurality of selectable accumulator means, at least one different accumulator means associated with each of said stored programs, each accumulator means being adapted to hold data used in the execution of the instructions for its associated program;
  (c) means for acquiring from said storage means during an instruction cycle an instruction belonging to one of said programs; and
  (d) means to select at said last named instruction cycle an accumulator means associated only with the program to which said acquired instruction belongs.

6. The invention as defined in claim 5 wherein each said accumulator means comprises at least one particular addressable location in said storage means, with said selecting means operating during said last named instruction cycle to address said storage means for the content of one of said accumulator means.

7. The invention as defined in claim 5 wherein said selecting means has plural input lines thereto which are adapted to receive any of a plurality of interrupt event signals randomly occurring one on each said input line, each signal specifying upon occurrence a particular one of said stored programs and all signals having a priority relationship among themselves as determined by the input lines on which they occur, with said selecting means being conditioned to select an accumulator means at said last named instruction cycle according to the interrupt event signal having the highest priority that was received by said selecting means prior to commencement of said last named instruction cycle.

8. The invention as defined in claim 7 wherein each siad accumulator means comprises at least one particular addressable location in said storage means, with said selecting means operating during said last named instruction cycle to address said storage means for the content of one of said accumulator means.

9. In a data processing system controlled in accordance with instructions acquired and executed one at a time during instruction cycles, the combination comprising:
  (a) means adapted to store at addressable locations thereof a plurality of programs, each program comprised of a group of instructions having specfic addresses;
  (b) a plurality of selectable index register means, at least one different index register means associated with each of said stored programs, each index register means being adapted to hold a modifying number for the addresses of operands used in the execution of the instructions for its associated program;
  (c) means for acquiring from said storage means during an instruciton cycle an instruction belonging to one of said programs; and
  (d) means to select at said last named instruction cycle an index register means associated only with the program to which said acquired instruction belongs.

10. The invention as defined in claim 9 wherein each said index register means comprises at least one particular addressable location in said storage means, with said selecting means operating during said last named instruction cycle to address said storage means for the content of one of said index register means.

11. The invention as defined in claim 9 wherein said selecting means has plural input lines thereto which are adapted to receive any of a plurality of interrupt event signals randomly occurring one on each said input line, each signal specifying upon occurrence a particular one of said stored programs and all signals having a priority relationship among themselves as determined by the input lines on which they occur, with said selecting means being conditioned to select an index register means at said last named instruction cycle according to the interrupt event signal having the highest priority that was received by said selecting means prior to commencement of said last named instruction cycle.

12. The invention as defined in claim 11 wherein each said index register means comprises at least one particular addressable location in said storage means, with said selecting means operating during said last named instruction cycle to address said storage means for the content of one of said index register means.

13. In a data processing system controlled in accordance with instructions acquired and executed one at a time during instruction cycles, the combination comprising:
  (a) means adapted to store at addressable locations thereof a plurality of programs, each program comprised of a group of instructions having specific addresses;
  (b) a plurality of program address means, a different one associated with each of said stored programs, each program address means being selectable to thereby sequentially supply the addresses of all in-instructions of its associated program one at a time during successive instruction cycles;
  (c) a plurality of selectable accumulator means, at least one different accumulator means associated with each of said stored programs, each accumulator means being adapted to hold data used in the execution of the instructions for its associated program; and
  (d) means to select at an instruction cycle any one of said program address means for supplying the address of an instruction to be acquired during said last named instruction cycle, and an accumulator means associated only with the program to which said acquired instruction belongs.

14. The invention as defined in claim 13 wherein each said program address means includes an instruction address holding register individual thereto, which is provided by at least one particular addressable location in said storage means, each said accumulator means comprises at least one particular addressable location in said storage means, with said selecting means operating during said last named instruction cycle to address said storage means first for the content of one of said registers and subsequently for the content of one of said accumulator means.

15. The invention as defined in claim 13 wherein said selecting means has plural input lines thereto which are adapted to receive any of a plurality of interrupt event signals randomly occurring one on each said input line, each signal specifying upon occurrence a particular one of said stored programs and all signals having a priority relationship among themselves as determined by the input lines on which they occur, with said selecting means being conditioned to select a program address means and an accumulator means at said last named instruction cycle according to the interrupt event signal having the highest priority that was received by said selecting means prior to commencement of said last named instruction cycle.

16. The invention as defined in claim 15 wherein each said program address means includes an instruction address holding register individual thereto, which is provided by at least one particular addressable location in said storage means, each said accumulator means comprises at least one particular addressable location in said storage means, with said selecting means operating during said last named instruction cycle to address said storage means first for the content of one of said registers and subsequently for the content of one of said accumulator means.

17. In a data processing system controlled in accordance with instructions acquired and executed one at a time during instruction cycles, the combination comprising:
(a) first means to store at particular addressable locations thereof a plurality of programs, each program being comprised of a group of instructions;
(b) a plurality of like sets of operational registers, a different set associated with each of said programs for holding information required in the acquisition and execution of only its instructions, with the operational registers of each set being particular addressable locations in said first means which are different from the said program storing addressable locations;
(c) second means adapted during an instruction cycle to receive the addresses of all first means locations to be referenced during said last named instruction cycle; and
(d) third means operating during said last named instruction cycle whenever operational registers are to be referenced to force addresses into said second means identifying operational registers of only one set.

18. The invention as defined in claim 17 wherein said third means has plural input lines which are adapted to receive any of a plurality of interrupt event signals randomly occurring one on each said input line, each signal specifying upon occurrence a particular one of said stored programs and all signals having a priority relationship among themselves as determined by the said input lines in which they occur, with said third means being conditioned for operation during said last named instruction cycle to force addresses into said second means which identify operational registers of the set associated with that program specified by the interrupt event signal having the highest priority that was received by said third means prior to commencement of said last named instruction cycle.

19. The invention as defined in claim 18 wherein fourth means is provided which is responsive to the execution of a predetermined instruction of any priority program during an instruction cycle to thereby condition said third means, during a subsequent instruction cycle, to force addresses into said second means identifying operational registers of that set which is associated with the next lower priority program whose specifying interrupt event signal has been received by said third means.

20. The invention as defined in claim 18 wherein for a number N of stored programs, said third means includes a first plurality of binary stages, at least one stage for each of at least $N-1$ stored programs which can be set to a predetermined state by an interrupt event signal received on at least one of said input lines, a biasing register whose content is transferable to said second means for comprising at least part of an operational register address therein, and means normally operating during an instruction cycle prior to the addressing of any operational register for placing into said biasing register a content determined according solely to the highest priority indicating stage in said first plurality which is set to said predetermined state.

21. The invention as defined in claim 20 wherein further means is provided which is responsive to the execution of a particular instruction during a current instruction cycle for inhibiting operation of said last named means during a next following instruction cycle.

22. The invention as defined in claim 20 wherein fourth means is provided which is responsive both to the execution of a predetermined instruction of any priority program during an instruction cycle and to the content in said biasing register, to thereby change the state of that stage in said first plurality to which said content refers.

23. In a data processing system controlled in accordance with instructions acquired and executed one at a time during instruction cycles, the combination comprising:
(a) means to store at addressable locations thereof a plurality of programs, each program being comprised of a group of instructions having specific addresses;
(b) a plurality of like sets of operational registers, a different set associated with each of said programs for holding information required in the acquisition and execution of only its instructions; and
(c) means operating during an instruction cycle, whenever operational registers are to be used, to select the operational registers of some one set according to whichever program is to be executed.

24. The invention as defined in claim 23 wherein said last named means has plural input lines which are adapted to receive any of a plurality of interrupt event signals randomly occurring one on each said input line, each signal specifying upon occurrence a particular one of said stored programs and all signals having a priority relationship among themselves as determined by the said input lines on which they occur, with said last named means being conditioned for operation during said last named instruction cycle to select operational registers of the set associated with that program identified by the interrupt event signal having the highest priority that was received by said last named means prior to commencement of said last named instruction cycle.

25. The invention according to claim 24 wherein means is further provided which is responsive to the execution of a predetermined instruction of any priority program during an instruction cycle to thereby condition said last named means, during a subsequent instruction cycle, to select operational registers of that set which is associated with the next lower priority program whose specifying interrupt event signal has been received by said last named means.

26. The invention as defined in claim 24 wherein for a number N of stored programs, said last named means includes a first plurality of binary stages, at least one for each of at least $N-1$ stored programs which can be set to a predetermined state by an interrupt even signal received on at least one of said input lines, a biasing register whose content is used to select a set of operational registers, and means operating during said last named instruction cycle but prior to the selection of any operational register for placing into said biasing register a content determined according solely to the highest priority indicating stage in said first plurality which is set to said predetermined state.

27. The invention as defined in claim 26 wherein further means is provided which is responsive to the execution of a particular instruction during a current instruction cycle for inhibiting operation of said last named means during a next following instruction cycle.

28. The invention as defined in claim 26 wherein further means is provided which is responsive both to the execution of a predetermined instruction of any priority program during an instruction cycle and to the content in said biasing register, to thereby change the state of that stage in said first plurality to which said content refers.

29. In a data processing system controlled in accordance with instructions acquired and executed one at a time during instruction cycles, the combination comprising:
(a) a first plurality of binary stages each having a different priority significance arbitrarily assigned thereto and each adapted to be individually set to a predetermined state;

(b) a register comprised of a second plurality of binary stages; and (c) means interconnecting the outputs of said first plurality of stages and conditioned only once during each instruction cycle to place into said register a content determined solely by the highest priority signifying stage of said first plurality which is set to said predetermined state.

30. The invention according to claim 29 wherein said register has a lesser number of stages than said first plurality.

31. The invention according to claim 29 wherein furthere means is provided which is conditioned during a particular instruction cycle to respond to the content in said register in order to change the state of that stage in said first plurality to which said content refers.

32. The invention according to claim 31 wherein said register has a lesser number of stages than said first plurality.

33. In a data processing system controlled in accordance with instructions acquired and executed one at a time during instruction cycles, where each instruction includes at least one zone adapted to contain a value specifying which one of N of identical function operational registers is to be used in the execution of the instruction, the combination comprising:

(a) means to store at particular addressable locations thereof a plurality of programs, each program being comprised of a group of instructions;

(b) a different group of N identical function operational registers associated with each of said programs;

(c) means for acquiring from said storage means during an instruction cycle an instruction belonging to one of said programs;

(d) first means operating during said last named instruction cycle to specify only that group of N operational registers which is associated with the program to which the said acquired instruction belongs; and (e) second means responsive during said last named instruction cycle to both said first means and to the value in said zone of the said acquired instruction to select an operational register of said specified group.

34. The invention as defined in claim 33 wherein said first means has plural input lines thereto which are adapted to receive any of a plurality of interrupt event signals randomly occurring one on each said input line, each signal specifying upon occurrence a particular one of said stored programs and all signals having a priority relationship among themselves as determined by the input lines on which they occur, with said first means being conditioned to normally specify during said last named instruction cycle the group of operational registers associated with that program specified by the interrupt event signal having the highest priority that was received by said first means prior to commencement of said last named instruction cycle.

35. The invention as defined in claim 34 wherein means is further provided which is responsive to the execution of a predetermined instruction of any priority program during an instruction cycle to thereby condition said first means, during a subsequent instruction cycle, to specify that group of operational registers which is associated with the next lower priority program whose specifying interrupt event signal has been received by said first means.

36. The invention as defined in claim 33 wherein each group of said identical function operational registers comprise different addressable locations in said storage means, and said second means is a storage address register adapted to have one portion thereof receive a group specifying value from said first means and another portion thereof adapted to receive the operational register specifying value from said zone of the said acquired instruction.

References Cited by the Examiner

UNITED STATES PATENTS

| | | | |
|---|---|---|---|
| 3,061,192 | 10/1962 | Terzian | 235—157 |
| 3,079,082 | 2/1963 | Scholten et al. | 235—157 |
| 3,094,610 | 6/1963 | Humphrey et al. | 235—157 |
| 3,117,220 | 1/1964 | Wensley | 235—157 |
| 3,168,724 | 2/1965 | Anderson | 340—172.5 |

ROBERT C. BAILEY, *Primary Examiner.*

MALCOLM A. MORRISON, *Examiner.*

R. M. RICKERT, *Assistant Examiner.*